United States Patent [19]

Steiner

[11] Patent Number: 5,619,086
[45] Date of Patent: Apr. 8, 1997

[54] TWIN BOBBIN C-FRAME MOTORS AND METHODS FOR MAKING SAME

[76] Inventor: Robert E. Steiner, 1760 Horseshoe Ridge, Chesterfield, Mo. 63005

[21] Appl. No.: 381,187

[22] Filed: Jan. 31, 1995

Related U.S. Application Data

[63] Continuation-in-part of Ser. No. 129,336, Sep. 30, 1993, and Ser. No. 199,600, Feb. 22, 1994, abandoned.

[51] Int. Cl.$^6$ .................................................. H02K 17/10
[52] U.S. Cl. ........................... 310/259; 310/172; 310/216; 242/437.2
[58] Field of Search .................................. 310/254, 172, 310/216, 258, 218, 171, 180, 184, 187, 193, 259; 29/603.23, 603.24, 606, 894.2; 242/437.2

[56] References Cited

U.S. PATENT DOCUMENTS

| | | | |
|---|---|---|---|
| 392,660 | 11/1888 | Bidwell | 310/194 |
| 1,569,218 | 1/1926 | Dake | 310/250 |
| 3,436,574 | 4/1969 | Larsson | 310/194 |
| 3,502,922 | 3/1970 | Welker | 310/172 |
| 3,553,621 | 1/1971 | Lane | 336/192 |
| 3,694,903 | 10/1972 | Deming | 29/596 |
| 4,017,776 | 4/1977 | Fiegel | 318/208 |
| 4,134,035 | 1/1979 | Donahoo | 310/42 |
| 4,482,832 | 11/1984 | Minton | 310/216 |
| 4,554,471 | 11/1985 | Bertram et al. | 310/49 R |
| 4,600,864 | 7/1986 | Sato | 318/254 |
| 4,786,834 | 11/1988 | Grant et al. | 310/194 |
| 4,801,775 | 1/1989 | Cornell | 219/10.55 |
| 4,801,776 | 1/1989 | Cornell | 219/10.55 |
| 4,827,237 | 5/1989 | Blackburn | 336/212 |
| 4,883,997 | 11/1989 | De Cesare | 310/179 |
| 4,942,323 | 7/1990 | De Cesare | 310/208 |
| 5,130,591 | 7/1992 | Sato | 310/172 |

*Primary Examiner*—Steven L. Stephan
*Assistant Examiner*—Jonathan Link
*Attorney, Agent, or Firm*—Polster, Lieder, Woodruff & Lucchesi

[57] ABSTRACT

A C-frame motor having cooperating first and second stack of laminations is disclosed. The first stack of laminations includes an end leg with a spaced pair of side legs which are attached at one end to the end leg and terminate in an opposite end in an outer free extremity. A rotor opening is provided in the end leg of each first stack of laminations. When stacked, the rotor openings of adjacent stacked end legs provide an aligned rotor opening for receiving a rotor. Each of the stacked side legs have a combined predetermined outer cross sectional configuration coil winding area that provides a coil winding area for receiving an electrically conductive coil on each of the stacked side legs. The second stack of laminations is attached to the outer free extremity of the spaced pair of stacked side legs in the first stack of laminations in order to provide a combined magnetic inductor circuit. Each electrically conductive coil is preferably wound about an insulating bobbin which may be integrally connected to another insulating bobbin to facilitate winding of an electrically conductive wire about the insulating bobbins and subsequent mounting of the insulating bobbins over the spaced stacked side legs of the first stack of laminations. Improved methods of manufacturing the first and second stack of laminations from an elongated strip of magnetically conductive material are also disclosed.

43 Claims, 12 Drawing Sheets

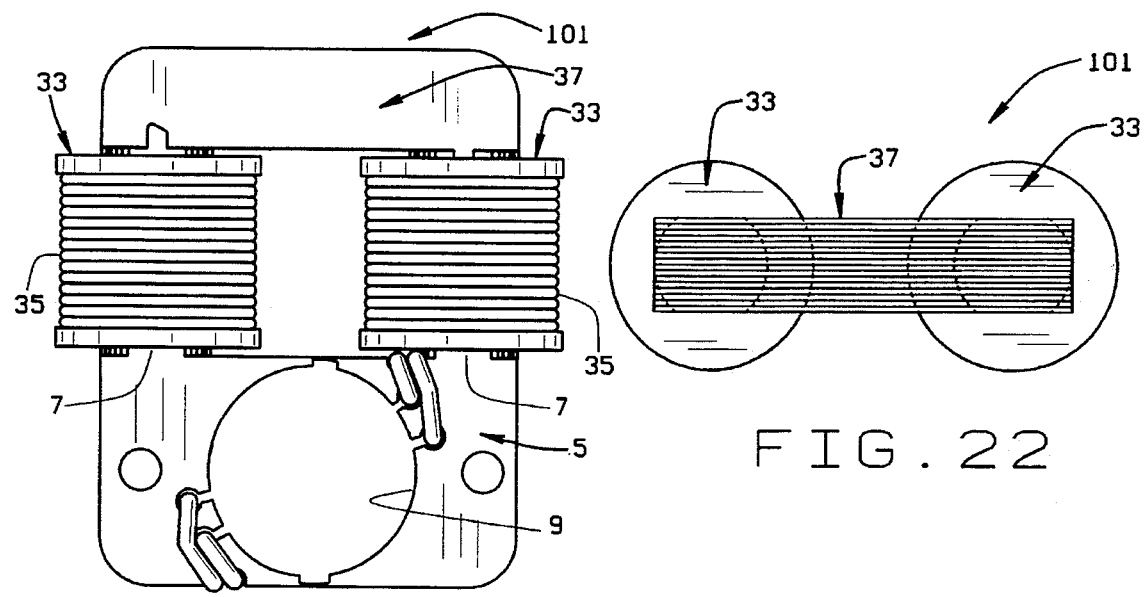
FIG. 21
FIG. 22
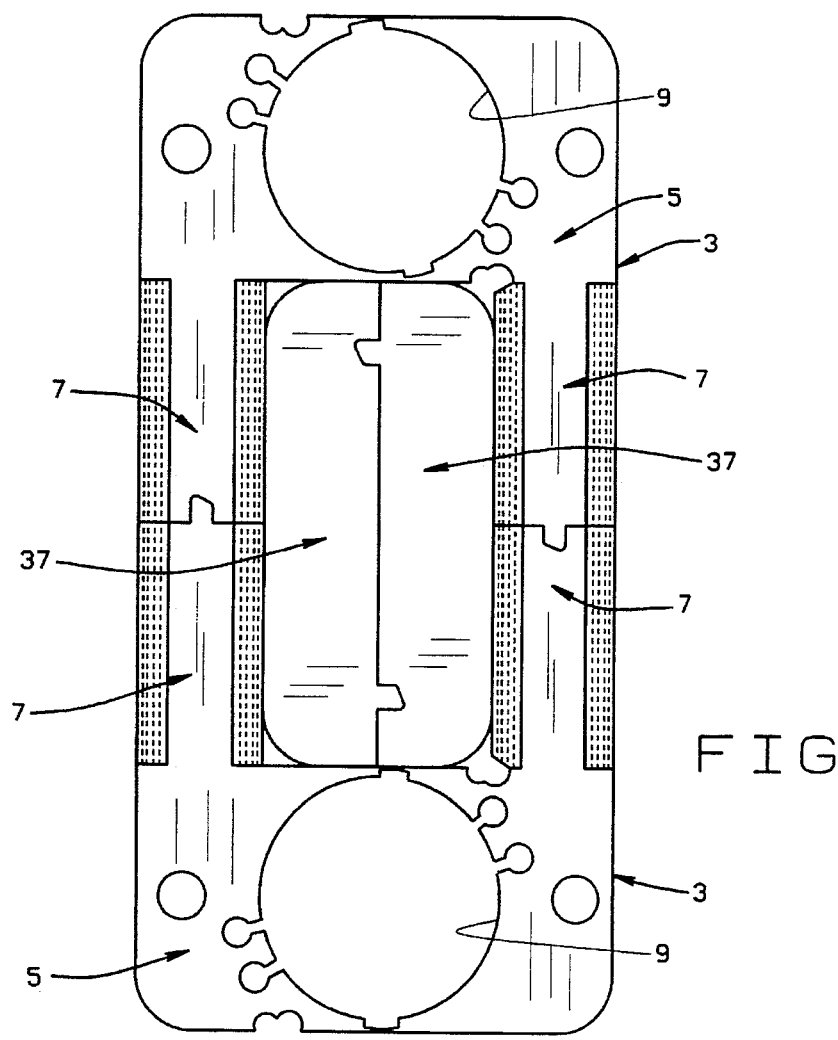
FIG. 23

TWIN BOBBIN C-FRAME MOTORS AND METHODS FOR MAKING SAME

CROSS REFERENCE TO RELATED APPLICATIONS

This is a continuation-in-part of the following patent applications: U.S. Ser. No. 08/129,336 filed Sep. 30, 1993 entitled METHOD FOR MANUFACTURING IMPROVED ELECTRO-MAGNETIC INDUCTION DEVICES, U.S. Ser. No. 08/190,600 filed Feb. 22, 1994 entitled LOW COST C-FRAME MOTORS AND METHODS OF MANUFACTURE, now abandoned.

BACKGROUND OF THE INVENTION

The present invention relates to low cost C-frame motors and their methods of manufacture, and more particularly, to new and improved twin bobbin C-frame motors and their methods of manufacture.

conventional C-frame motor construction, a first stack of magnetically conductive laminations is provided with aligned circular-shaped rotor openings at one end and aligned U-shaped openings at a second end. A separate elongated second stack of laminations is mounted the first stack of laminations across the aligned U-shaped openings of the first stack of laminations after a single electrically conductive coil is positioned over the separate elongated second stack of laminations. The second stack of laminations thus provides a coil winding area about which an electrically conductive coil can be positioned for introducing flux into a rotor that is received within the aligned rotor openings of the first stack of laminations, in order to provide a magnetic inductor circuit.

In such conventional C-frame motors, the outer cross sectional shape of the coil winding area of the second stack of laminations is typically square when the stack height of the motor equals the width of the coil winding area cross section. This is the most efficient stack height with respect to copper usage in the electrically conductive coil because the ratio of the perimeter to the cross sectional area of the coil winding area is at a minimum. As the stack height of the laminations is increased, to increase the horsepower output of the motor, the cross sectional area to the coil winding area becomes more and more rectangular and the ratio of the perimeter to the area of the winding area becomes larger and less efficient. Also, reducing the stack height to make lower horsepower output motors causes the cross sectional area of the coil winding area to become more rectangular and therefore, also less efficient. The legs in the first stack of laminations and the second stack of laminations that form the coil winding area typically have approximately equal cross sectional areas.

As disclosed in my aforementioned copending patent application U.S. Ser. No. 08/199,600 entitled LOW COST C-FRAME MOTORS AND METHODS OF MANUFACTURE, it has been discovered that if the outer cross sectional shape of the coil winding area in the second stack of laminations is provided with a generally circular outer cross sectional configuration which is actual to the area in the legs of the first stack of laminations, the motor will always have a minimum ratio of winding area meter to cross sectional area and therefore the minimum amount of usage of copper. In some intances, more lamination material is required, and in other cases, less lamination material is required. However, in all instances, the copper savings are more than sufficient in order to provide significant overall savings as long as the coil winding area of the second stack of laminations has a generally circular construction.

In addition to the new and improved design for C-frame motors as disclosed in my aforementioned copending patent application, it has also been discovered that both of the spaced side legs of the first stack of laminations can he usefully employed for coil winding purposes, whether made in the typical four-sided (square or rectangular) shape or in a higher order (greater than four sides up to a partial or full circular) shape. In either such case, if the coil winding areas the spaced side legs in the first stack of laminations are positioned in proximity to the aligned openings and rotor, several important advantages can be achieved. This construction permits electrically conductive coils to be mounted over the spaced side legs, thus providing a greater and/or more efficient flow of magnetic flux through the rotor of the magnetic inductor circuit. Also, the electrically conductive wire forming the electrically conductive coil that is positioned over each of the spaced side legs has less than one-half the length of a single electrically conductive coil in a conventional C-frame motor construction, and the diameter of the electrically conductive wire can be reduced, as well.

The use of less than one-half the length for the electrically conductive coil mounted on each pair of spaced side legs of the first stack of laminations is due to the greater winding length smaller mean winding diameter for the two electrically conductive coils positioned on the spaced side legs as compared to a single electrically conductive coil in a conventional C-frame motor construction. As a result, there is a shorter wire length for each of the electrically conductive coils that are positioned over one of the spaced side legs. Additionally, there is a reduction in the diameter of the electrically conductive wire for both electrically conductive coils. This wire diameter reduction is believed due to the shorter wire length of each electrically conductive coil, the greater winding surface area of the two electrically conductive coils and the proximate location of the spaced electrically conductive coils on the surfaced side legs of the first stack of laminations relative to the aligned rotor openings and rotor.

The aforementioned proximate location of the electrically conductive coils provides a efficient flow of magnetic flux from the magnetic inductor circuit through the poles and into the rotor of the motor. In some instances, the overall dimension of the motor can be reduced also reduce the length of the flux path, as well. In fact, performance tests have established that motors constructed with this construction have a greater overall efficiency than conventional C-frame motors of the type described above. For example, this improved motor efficiency was established where the outer cross sectional side leg shape had a higher order greater than four sides, along with savings in copper usage. However, this improved motor efficiency is also possible even where the outer cross sectional configuration of the side legs have the typical four-sided (square or rectangular) configuration.

In the discussion that follows, the present invention discloses new and improved motor constructions of the type generally described above, as well as new and improved methods of manufacturing such motor constructions also with improved efficiency and lower material usage.

SUMMARY OF THE INVENTION

Among the several objects and advantages of the present invention include:

The provision of a new and improved low cost and high efficiency C-frame motor construction:

The provision of the aforementioned C-frame motor construction which employ twin bobbin constructions on spaced side legs of the C-frame construction:

The provision of the aforementioned C-frame motor constructions which have a substantial reduction in the amount of material required:

The provision of the aforementioned C-frame motor constructions which enjoy substantial material savings in the amount of material required for electric conductive coils and, in certain instances, also in the magnetically conductive means forming the magnetic inductor circuit;

The provision of the aforementioned C-frame motor constructions which further include additional material savings in other components used in such motors;

The provision of the aforementioned C-frame motor constructions which, despite having substantial material savings in the construction of such motors, nonetheless provides better efficiency and overall performance than prior art C-frame motors;

The provision of the aforementioned C-frame motor constructions which are readily adaptable to present manufacturing techniques, do not require substantial modifications or changes and provide highly efficient, better overall operating, lower cost motors than prior art constructions;

The provision of a new and improved method of manufacturing such low cost, high efficiency C-frame motors;

The provision of a new and improved method of forming such low cost, high efficiency C-frame motors with new and improved method or procedural steps that provide reliable, continuous operation without substantial modifications or changes in known manufacturing techniques.

Briefly stated, the low cost, high efficiency C-frame motor of the present invention includes magnetically conductive stacked laminations each having a spaced pair of end legs and a spaced pair of side legs. The combined stack configuration of such laminations provide spaced and stacked end legs and spaced and stacked side legs. At least one of the stacked end legs have aligned rotor openings for receiving a rotor. The coil winding area for each of the stacked side legs having a combined predetermined outer cross sectional configuration in order to enable an electrically conductive coil to be positioned about the coil winding area of each of the stacked side legs.

At least one end leg is integral with the spaced pair of side legs. The aligned rotor openings may be formed in the end legs of the laminations which are integral with the side legs. Preferably, one end leg of each lamination is separate from the spaced side legs with integral end leg. Each such separate end leg is attached to the spaced side legs at an outer free extremity thereof.

An electrically conductive coil, when positioned about a respective coil winding area of each of the stacked side legs, is positioned in close proximity to the poles of the motor, the aligned rotor openings and the rotor.

An electrically conductive wire forms each electrically conductive coil and is preferably layer wound in closely packed relationship in a plurality of juxtaposed rows in its positioned relationship on each coil winding area. Preferably, an insulating bobbin with wound electrically conductive coil is positioned on each coil winding area of the stacked side legs. The electrically conductive wire forming each electrically conductive coil has less than one-half the length of an electrically conductive wire forming a single electrically conductive coil in an equivalent magnetic inductor circuit. Preferably, the electrically conductive wire for each of the spaced side legs has both a smaller predetermined length and a predetermined smaller diameter than an equivalent electrically conductive wire of a single electrically conductive coil in an equivalent magnetic inductor circuit.

The combined predetermined outer cross sectional coil winding area of each of the stacked side legs may have a four-sided (square or rectangular) outer cross sectional shape with each electrically conductive coil positioned about each of the stacked side legs also having a corresponding shape. Alternatively, the combined predetermined outer cross sectional coil winding area of each of the stacked side legs may have a higher order greater than four sides outer cross sectional configuration with each electrically conductive coil positioned about each of said stacked side legs having a corresponding shape, as well.

The motor preferably has first and second stacks of laminations. The first stack of laminations include magnetically conductive stacked laminations each having an end leg and a spaced pair of side legs. The spaced pair of side legs are attached at one end to the end leg and terminate at an opposite end in an outer free extremity. The combined stacked end legs and spaced pair of stacked side legs provide the first stack of laminations. Rotor openings are provided in the end leg of each lamination that is aligned with the rotor openings of adjacent stacked end legs in order to provide an aligned rotor opening in the stacked end legs for receiving a rotor. Each of the stacked side legs have a combined predetermined outer cross sectional configuration coil winding area. An electrically conductive coil is positioned about the coil winding area of each of the stacked side legs. A second stack of laminations comprising a corresponding number of separate magnetically conductive stacked laminations are attached to the outer free extremity of the spaced pair of stacked side legs of the first stack of laminations in order to provide a combined magnetic inductor circuit therethrough.

The motor has pole shading elements positioned in openings surrounding the aligned rotor opening which are in proximity to the poles of the motor. Both of the pole shading elements on the upper end of the aligned rotor opening are preferably angled or curved toward the center between the stacked side legs in order to reduce the width of and/or the spacing between the stacked side legs and thus the overall dimension of the motor.

Preferably, the insulating bobbin with wound electrically conductive coil that is positioned about the coil winding area of the stacked side legs comprises a spaced pair of insulating bobbins which are integrally connected to one another, while the associated wound electrically conductive coils of the insulating bobbins includes an electrically conductive wire that is integrally and electrically connected and wound about both of the insulating bobbins. The spaced pair of insulating bobbins have aligned longitudinal axes when wound with the electrically conductive wire and generally parallel longitudinal axes when mounted on the coil winding areas of the spaced and stacked side legs.

The insulating bobbin assembly used in the present invention includes a spaced pair of insulating bobbins having aligned longitudinal axes which are integrally connected to one another across a living foldable hinge. The spaced pair of insulating bobbins are maintained in longitudinally and axially aligned relationship during the winding of an electrically conductive wire forming an electrically conductive coil about each bobbin. The spaced pair of insulating bobbins are then folded about the living foldable hinge to position the longitudinal axes of the bobbins in generally parallel relationship for mounting over spaced legs in a magnetic inductor circuit.

The living foldable hinge includes releasable locking means to maintain the spaced pair of bobbins in longitudinal axially aligned relationship. Each insulating bobbin includes an end aperture in order to enable an electrically conductive wire to extend between the insulating bobbins. The living foldable hinge preferably includes releasable locking end flaps for covering the electrically conductive wire between the insulating bobbins.

The present invention also discloses a new and improved method of forming C-frame motors by forming C-frame laminations each having an end leg integral with spaced side legs from an elongated strip of magnetically conductive material. Adjacent C-frame laminations are stamped from the elongated strip with the integral end legs and spaced side legs of each lamination in generally opposed mirror image relationship to one another with the spaced side legs extending longitudinally along the length of the strip. The spaced side legs are formed with a combined predetermined outer cross sectional configuration coil winding area when the laminations are stacked. Two separate end legs are formed for attachment to the outer free extremities of each pair of spaced side legs, at least one of the separate end legs being formed from the elongated strip.

Preferably, at least some of the separate end leg laminations are formed from the elongated strip between the spaced legs of the C-frame laminations. At least some of the separate end leg laminations may also be formed from outside of the confines of the elongated strip. At least some of the separate end leg laminations may also be formed from a separate elongated strip of magnetically conductive material. In certain instances, at least two separate end leg laminations may be formed from the elongated strip between the opposed and spaced side legs of adjacent C-frame laminations. Complementary fastening elements may also be formed between the opposed and spaced side legs of adjacent C-frame laminations for attachment to complementary fastening elements formed in separate end leg laminations.

The method of the present invention also includes the forming of a series of magnetically conductive C-shaped laminations each having an end leg with a rotor opening and a spaced pair of side legs integral with and extending from the end leg and terminating in an outer free extremity. Each of the side legs are formed with a predetermined outer cross sectional configuration coil winding segment. The C-shaped laminations are stacked with the stacked coil winding segments in each of the stacked side legs forming a coil winding area of combined predetermined outer cross sectional configuration. A series of separate magnetically conductive end leg laminations are also formed and stacked in a corresponding number to the C-shaped laminations for subsequent attachment to the outer free end of the side legs of the C-shaped laminations. After positioning an electrically conductive coil about the coil winding areas of each of the side legs, the separate magnetically conductive end leg laminations are attached to the outer free extremities of the side legs of the C-shaped laminations.

Preferably, the method includes the step of winding an electrically conductive wire about an insulating bobbin to form each electrically conductive coil. The insulating bobbins are integrally connected to one another to facilitate winding of the electrically conductive wire about the insulating bobbins and the subsequent mounting of the insulating bobbins over the spaced stack legs.

These and other objects and advantages of the present invention will become apparent from the description that follows.

BRIEF DESCRIPTION OF THE DRAWINGS

In the drawings.

FIG. 21 is a side elevational view of a modified form of twin bobbin C-frame motor according to the present invention;

FIG. 22 is a top plan view of a die layout used in the modified form of twin bobbin C-frame motor shown in FIG. 21;

FIG. 23 is a die layout view illustrating the method of manufacturing the modified C-frame and end laminations of the motor illustrated in FIGS. 21–22 of the drawings.

Corresponding reference numerals will be used throughout the various figures of the drawings.

DESCRIPTION OF THE PREFERRED EMBODIMENTS

Figure 1:
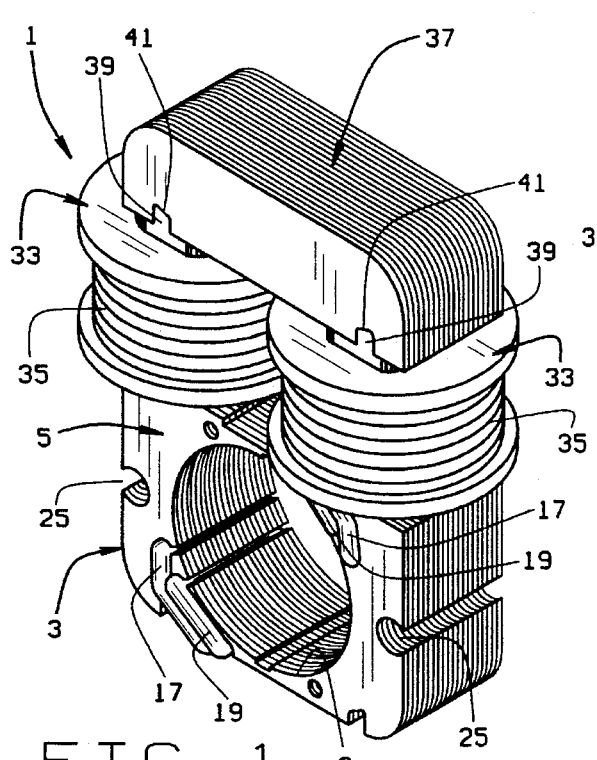
FIG. 1 is a perspective view of one form of low cost, high efficient twin bobbin C-frame motor construction of the present invention.

The following detailed description illustrates the invention by way of example and not by way of limitation. This description will clearly enable one skilled in the art to make and use the invention, and describes several embodiments, adaptions, variations, alternatives and uses of the invention, including what I presently believe is the best mode of carrying out the invention.

As explained in my prior parent patent application U.S. Ser. No. 08/129,336 filed Sep. 30, 1993, entitled METHOD FOR MANUFACTURING IMPROVED ELECTROMAGNETIC INDUCTION DEVICES, some prior art motor constructions may require the winding of electrically conductive wires in relatively loose fitting and random winding about coil or core winding areas that have a square or rectangular cross sectional configuration. As will be appreciated, this requires a predetermined amount of electrically conductive wire to form electrically conductive coils that are wound about the coil core winding areas in various motor constructions. By changing the coil winding area of the poles to a higher order greater than four sided construction, i.e., one having a substantially circular outer cross sectional configuration at least along opposed spaced sections thereof, several important advantages are achieved. First, a substantially circular outer cross sectional shape provides a cross sectional area with a shorter circumference in the magnetic inductor circuit to wind an electrically conductive wire in order to form an electrically conductive coil. Without sacrificing motor efficiency, the size of the electrically conductive wire can also be reduced in diametrical size. Additionally, the generally circular outer cross sectional shape enables the electrically conductive wire to be layer wound in closely packed relationship in a plurality of superimposed rows. This is preferably achieved by the use of an insulating bobbin which is constructed to permit the electrically conductive wire to be layer wound in the above described manner to form the electrically conductive coil. As a result, a close fitting and efficiently wound electrically conductive coil is provided. In conventional C-frame two pole motors, the outer cross sectional shape of the winding area is square when the stack height of the motor equals the width of the winding area cross section. For such conventional C-frame motors, this is the most efficient stack height for copper usage, because the ratio of the perimeter to the cross sectional area of the winding area is at a minimum. As the stack height of laminations is increased or decreased, to increase or decrease the horsepower output of the motor, the cross sectional area of the winding area becomes more and more rectangular and the ratio of the perimeter to the area of the winding area becomes larger and less efficient.

In my aforementioned copending patent application U.S. Ser. No. 08/199,600 filed Feb. 22, 1994 entitled LOW COST C-FRAME MOTORS AND METHODS OF MANUFACTURE, now abandoned, I have disclosed that by making the outer cross sectional shape of the winding area with a higher order shape greater than four sides, i.e., generally circular in outer cross sectional shape, as well as being always equal in area to the legs adjacent to the winding area in the C-frame motor, the motor will always have the minimum ratio of winding area perimeter to cross sectional area and therefore the minimum usage of copper. At or near the stack height of the motor where the diameter of the winding area equals the width of the motor legs, the amount of lamination material for the conventional design and the circular winding area would be the same. For shorter stack heights, the diameter of the winding area would be shorter than the width of the legs, and therefore, less material would be required whereas, for taller stack heights, the opposite is true. In all such cases of my aforementioned copending patent application, the copper savings nonetheless provide significant overall savings in motor material cost. This is due to the substantial reduction in the amount of material required for the electrically conductive coil, as well as the reduction, in certain instances, of the amount of material required for the laminations in the magnetic inductor circuit. In addition, additional savings are possible in other components such as smaller end bells/frame components or frame members which employ less material with lighter weight constructions.

In the new and improved C-frame motor design of the present invention as discussed below, it will be seen that the spaced side legs of the C-frame motor laminations can be usefully employed for coil winding purposes in order to provide new and unexpected results. Further, the present invention discloses and new and improved method for manufacturing such improved C-frame motor constructions.

The C-frame motor constructions of the present invention include several different embodiments as illustrated in FIGS. 1–6 of the drawings; FIGS. 7–11 of the drawings, FIGS. 12–18 of the drawings and FIGS. 21–22 of the drawings. In addition, several methods of manufacturing such modified C-frame motors are illustrated in FIGS. 19–20 and 23–24 of the drawings.

Although there are common features used in the various C-frame motor constructions of FIGS. 1–6; 7–11; 12–18 and 21–22 of the drawings, it will also be appreciated that each of the aforementioned C-frame motor constructions have unique and specific features that differ from each other, as will be explained in detail below.

Figure 2:
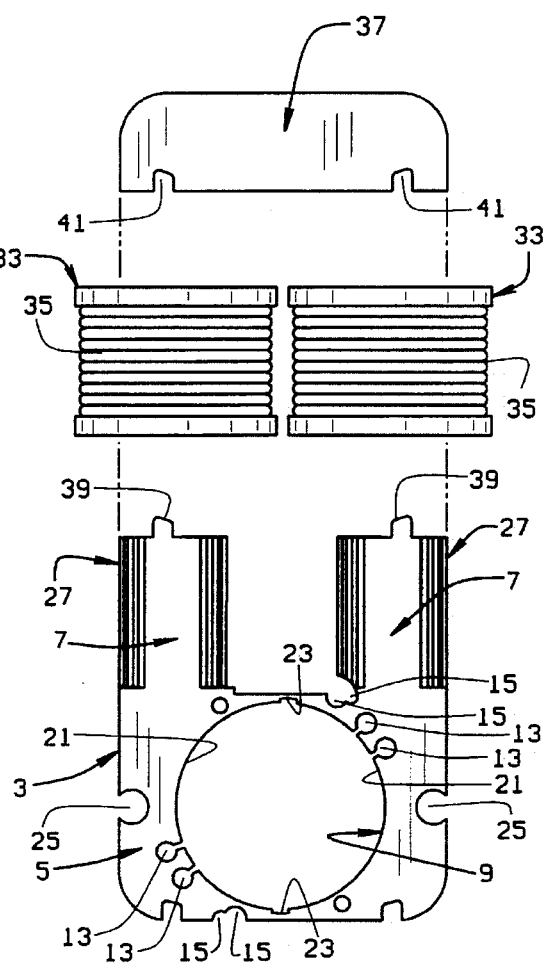
FIG. 2 is an exploded side elevational view of the twin bobbin C-frame motor shown in FIG. 1.
Figure 3:
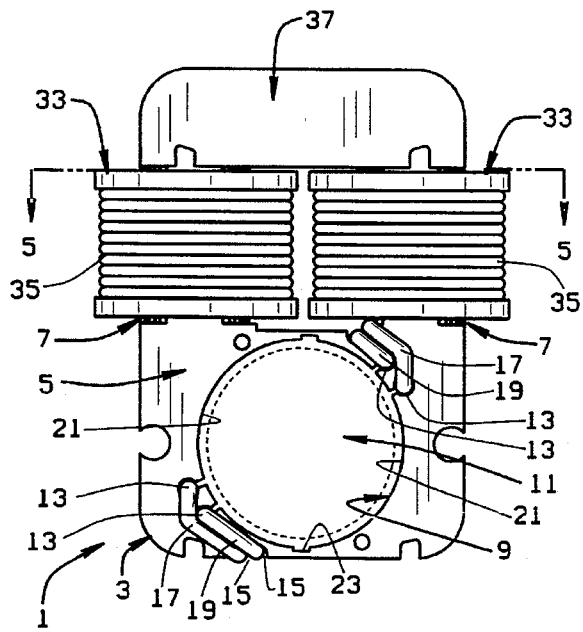
FIG. 3 is a side elevational view of the twin bobbin C-frame motor illustrated in FIG. 1.
Figure 4:
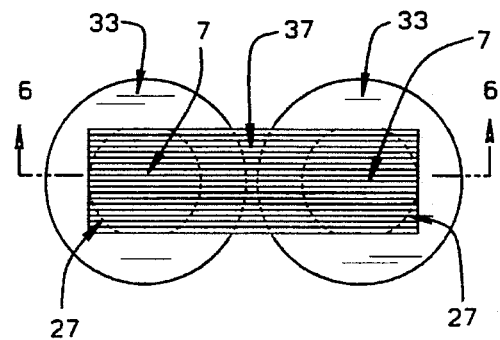
FIG. 4 is a top plan view of the twin bobbin C-frame motor as illustrated in FIG. 1.
Figure 5:
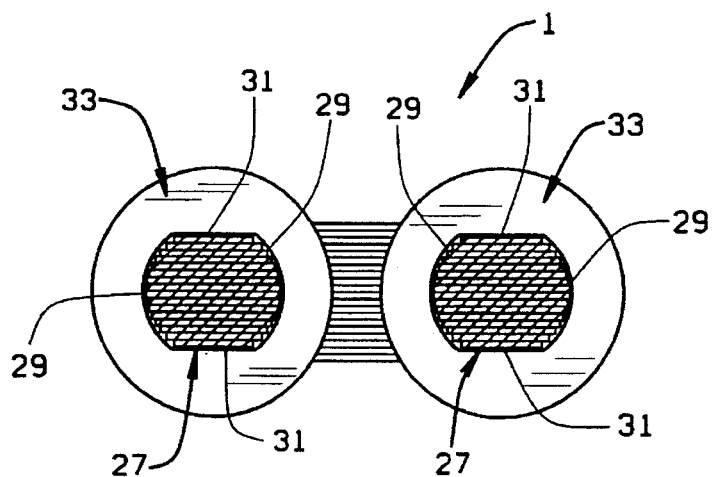
FIG. 5 is a sectional view of the twin bobbin C-frame motor shown in FIG. 1, as viewed along lines 5—5 of FIG. 3.

As illustrated in the FIGS. 1–6 embodiment, the C-frame two pole motor 1 includes a first stack of laminations 3 formed from a series of magnetically conductive stacked laminations of identical configuration each having an end leg 5 and a spaced pair of generally parallel side legs 7, 7. The spaced pair of side legs 7, 7 extend generally transversely to and are attached at one end to an outer or marginal end area of the end leg 5 and terminate at an opposite end in an outer free extremity. The combined stacked end legs 5 and spaced pair of side legs 7, 7 provide the first stack of laminations 3 with an outer side margin of each spaced side leg 7 being generally aligned with an outer end margin of each end leg 5 or, in the case of the second stack of laminations, the end leg 37. A rotor opening 9 is provided in the end leg 5 of each lamination that is aligned with the rotor openings 9 of adjacent stacked end legs 5 in order to provide an aligned rotor opening 9 in the stacked end legs 5 for receiving a rotor 11, as illustrated in FIG. 3 of the drawings. Each side leg 7 is thus attached at one end to a circumferentially spaced area of the end leg 5 that surrounds the rotor opening 9. The rotor 11 is made up of a series of stacked laminations having aluminum die cast bars and end rings.

The C-frame two pole motor 1 is of the shaded pole motor type which includes shading coils to produce starting torque and rotation of the rotor 11. For this purpose, each of the laminations are provided with generally diametrically opposed pairs of openings 13, 13 and 15, 15, each cooperating pairs of openings 13, 15 and 13, 15 receive a large and small shading coil 17, 19, respectively, as illustrated in FIG. 1 of the drawings. Each of the shading coils 17, 19 are formed by a loop of copper or other electrical conductor which is arranged to encircle one of the poles 21, 21 of the two pole motor, the poles 21, 21 being offset by the generally opposed reluctance gaps 23, 23 on opposite sides of the opening 9. Each of the larger and smaller shading coils 17, 19 are designed to be received in one of the opposed pairs of apertures 13, 13 at one end while being positioned in proximity to one another by the intersecting openings or apertures 15, 15 at another end. Typically, the shading coils are formed and welded to form two loops of conductive material which are adapted to be received by the pairs of openings 13, 13 and 15, 15 for encircling a portion of one of the motor poles 21, 21 on opposite sides of the rotor opening 9. It will be noted that the intersecting openings or apertures 15, 15 on one side of the aligned rotor opening 9 are arranged to be located generally between the stacked side legs 7, 7 of the first stack of laminations 3 in order to reduce the width of and/or the spacing between the stacked side legs 7, 7 and thus the overall dimension of the motor 1. Note specifically that the intersecting openings or apertures 15, 15 on one side of the aligned rotor opening 9 are located at the intersection of end leg 5 with one of the side legs 7. As a result, the pole shading elements 17, 19 in the upper portion of the aligned rotor opening 9 are angled or curved toward the center between the stacked side legs 7, 7 in order to reduce the combined width of and/or the spacing between stacked side legs 7, 7 and thus the overall width dimension of the motor. Reducing the overall width dimension reduces the flux path, increasing the efficiency of the motor, as will be discussed further below.

A pair of spaced C-shaped mirror image openings 25, 25 are provided on opposite sides of the first stack of laminations 3 in order to receive mounting screws that support a rotor bracket (not shown) for supporting the rotor 11 for rotation relative to the aligned rotor opening 9, as is well-known in the art.

Each of the stacked side legs 7, 7 of the first stack of laminations 3 have a combined predetermined outer cross sectional configuration coil winding area 27. In the FIGS. 1–6 embodiment, the combined predetermined outer cross sectional configuration coil winding area has a generally circular outer cross sectional shape, as best illustrated in FIGS. 2–5 of the drawings. Specifically, each of the stacked side legs 7, 7 have a substantially circular shape at least along opposed spaced sections 29, 29 thereof with opposed spaced flat areas 31, 31 along other opposed spaced sections thereof.

For purposes of the present invention, the term "higher order greater than four sides" includes a generally circular outer cross sectional shape including a full circular shape, a partially circular shape, a substantially circular shape at least along opposed spaced sections thereof or other modified shapes having a shorter outer peripheral length other than a square or rectangular shape. Thus, a hexagonal or other greater than four-sided shape may also be included. A square or rectangular shape, on the other hand, is considered to have a "four-sided" shape.

As disclosed in my aforementioned copending patent applications, each of the generally circular outer cross sectional shapes 27 of the spaced side legs 7, 7 are constructed with a different progressive width, as illustrated in FIGS. 2–5 of the drawings, in order to provide an incrementally stair-stepped winding area on opposite sides of a center line that produces the generally opposed spaced circular sections 29, 29 in the FIGS. 1–6 illustrated embodiment. The manner in which the different progressive widths are formed in adjacent stacked laminations, in order to produce the generally circular outer cross sectional shape 27 for the coil winding area of each of the stacked side legs 7, 7, will be further understood in reference to the discussion below that describes the preferred method of producing such a construction.

A pair of insulating bobbins 33, 33 with previously wound electrically conductive coil or wire 35 are capable of being mounted on each of the spaced stacked legs 7, 7. The distance between the spaced stacked legs 7, 7 provides an unimpeded joint winding window to accommodate insulating bobbins 33 with electrically conductive coils 35 on each coil winding area 22 of predetermined length and winding diameter, in an overall compact motor construction. Each of the insulating bobbins 33 are generally circular in shade corresponding to the generally circular outer cross sectional shape 27 of each of the stacked side legs 7, 7, thus producing a substantial reduction in the amount of material required liar the electrically conductive wire or coil 35, resulting in substantial cost savings in the amount of material required for the electrically conductive coil or wire 35.

Figure 6:
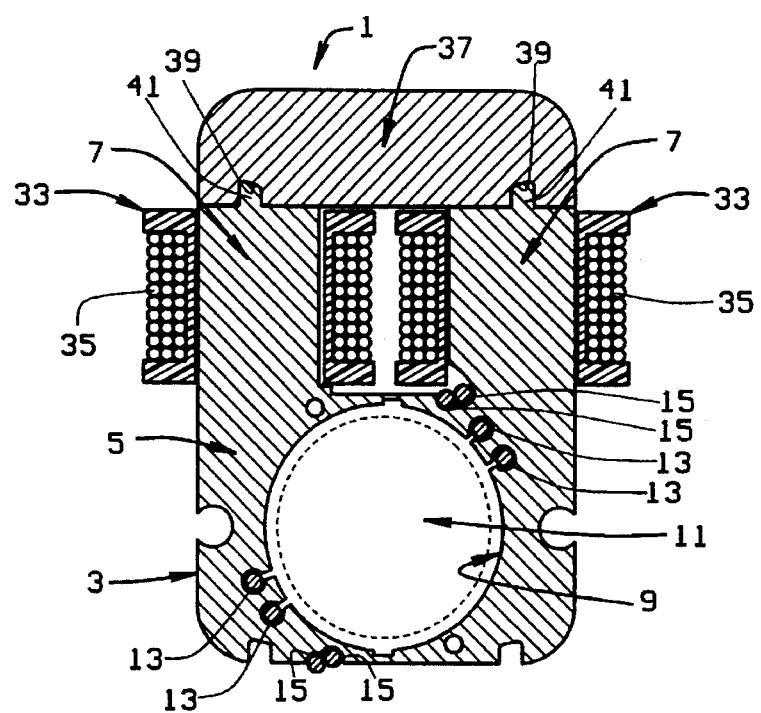
FIG. 6 is a sectional view of the twin bobbin C-frame motor illustrated in FIG. 1 as viewed along lines 6—6 of FIG. 4.
Figure 7:
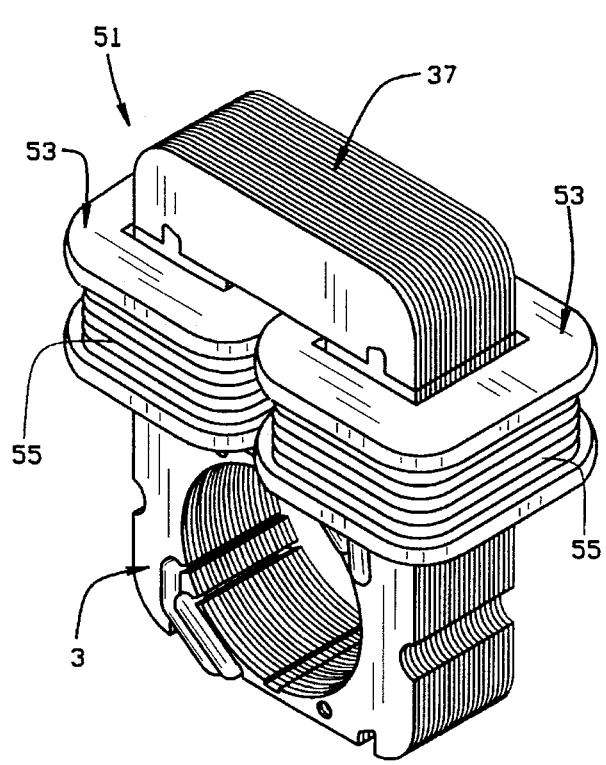
FIG. 7 is a perspective view of a modified form of twin bobbin C-frame motor utilizing a typical four-sided (square or rectangular) coil winding area for each of the stacked side legs of the C-frame laminations with correspondingly shaped electrically conductive coils.
Figure 8:
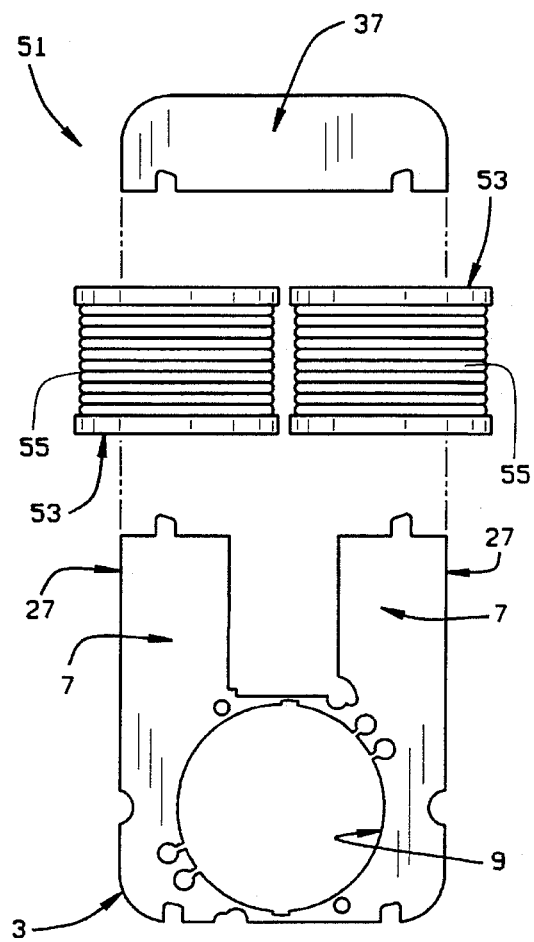
FIG. 8 is an exploded perspective view of the modified form of twin bobbin C-frame motor shown in FIG. 7.
Figure 9:
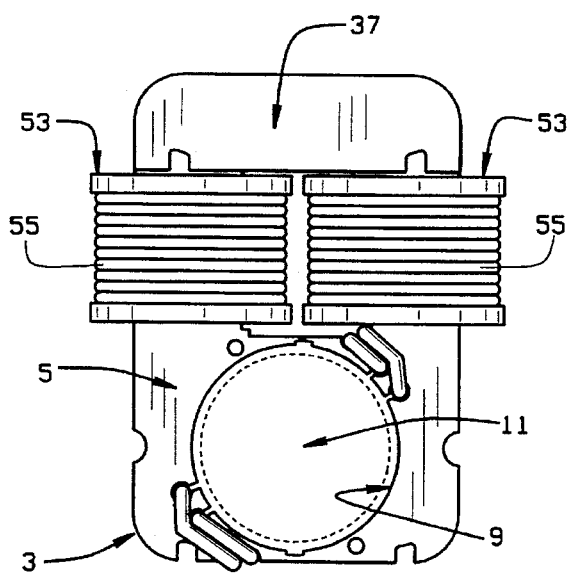
FIG. 9 is a side elevational view of the modified form of twin bobbin C-frame motors shown in FIG. 7.
Figure 10:
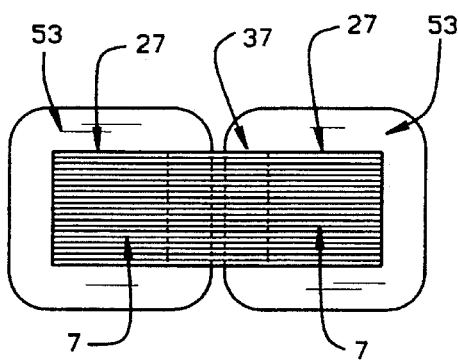
FIG. 10 is a top plan view of the modified twin bobbin C-frame motor shown in FIG. 7.

After each insulating bobbin 33 with wound electrically conductive coil or wire 35 is mounted on each of the stacked side legs 7, 7, a second stack of laminations 37 formed by a corresponding number of separate magnetically conductive stacked laminations are attached to the first stack of laminations 3, through the complementary shaped male and female fastening elements 39, 41, as illustrated in FIGS. 1, 2 and 6 of the drawings. Each of the second stack of laminations 37 form a second or separate end leg. Thus, the first stack of laminations 3 have separate legs including an end leg 5 and two spaced side legs 7, 7 in a general U-shaped configuration, while the separate magnetically conductive stacked laminations forming the second stack of laminations 37 provide a separate end leg for attachment to the first stack of laminations 3 in order to complete a magnetic inductor circuit for the C-frame motor 1. It will be understood that the two spaced side legs 7, 7 may be attached in an alternative embodiment to the end leg laminations 37 for subsequent attachment to the end leg laminations 5 after positioning of an insulating bobbin 33 with wound electrically conductive coil 35 on at least one and preferably both of said spaced side legs 7, 7. For this purpose, complementary, male and female fastening elements 39, 41 would be associated with the outer free extremities of the spaced side legs 7, 7 and end leg laminations 5.

For attaching the first and second stack of laminations 3, 37, respectively, to one another in the FIGS. 1–6 embodiment, the outer free extremities of each of the stacked side legs 7, 7 are each provided with an outwardly extending male tab 39 for complementary reception within a complementary shaped recess or opening 41 formed in the second stack of laminations 37. As will be seen from the discussion that follows, the male tabs 39 could be provided on the second stack of laminations 37 with corresponding female recesses 41 in the first stack of laminations 3, as may be desired. In either case, the shape of the male tabs 39 and the complementary, shaped recesses 41 have an irregular shape that provides greater interfitting engagement between the first and second stack of laminations 3, 37, respectively.

It will be noted that when each of the insulating bobbins 33 with wound electrically conductive coil or wire 35 is mounted on each of the stacked side legs 7 of the first stack of laminations 3, each electrically conductive coil 35 is mounted in close proximity to one motor pole 21, the aligned rotor opening 9 of the first stack of laminations 3 and the rotor 11. Additionally, the electrically conductive wire that forms at least one electrically conductive coil 35 has less than one-half the length of an electrically conductive wire forming a single electrically conductive coil in an equivalent magnetic inductor circuit. It will be appreciated that there is a greater surface winding area of the two electrically conductive coils 35, one of which is positioned on each of the stacked side legs 7 as compared to a single electrically conductive coil in a conventional C-frame motor. Because of the greater surface winding area, there is a greater winding length and smaller winding diameter for each of the two electrically conductive coils 35 as compared to a single electrically conductive coil. This results in a shorter wire length for each of the electrically conductive coils 35 that are positioned over one of the stacked side legs 7.

Further, the electrically conductive wire forming the electrically conductive coil 35 may also have a smaller diameter than a corresponding electrically conductive wire of a single electrically conductive coil in an equivalent magnetic inductor circuit. As explained above, this is believed due to the shorter wire length, the greater surface winding area and the proximate location of the spaced electrically conductive coils 35, 35 on the spaced side legs 7, 7 relative to the respective motor poles 21, 21, the aligned rotor opening 9 and the rotor 11.

Figure 11:
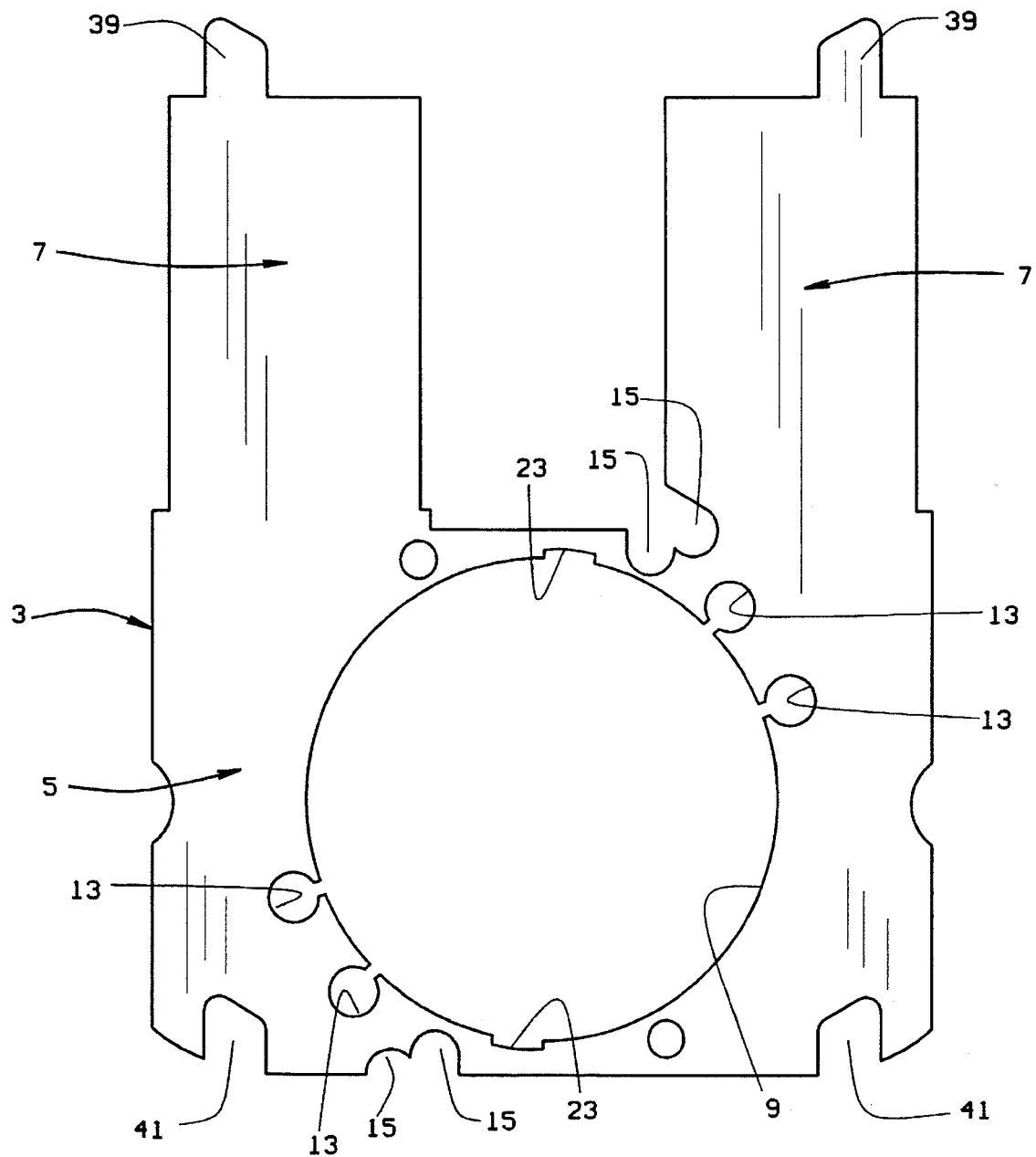
FIG. 11 is an enlarged side elevational view of a C-frame lamination used in the modified twin bobbin C-frame motor shown in FIGS. 7–10 of the drawings.
Figure 12:
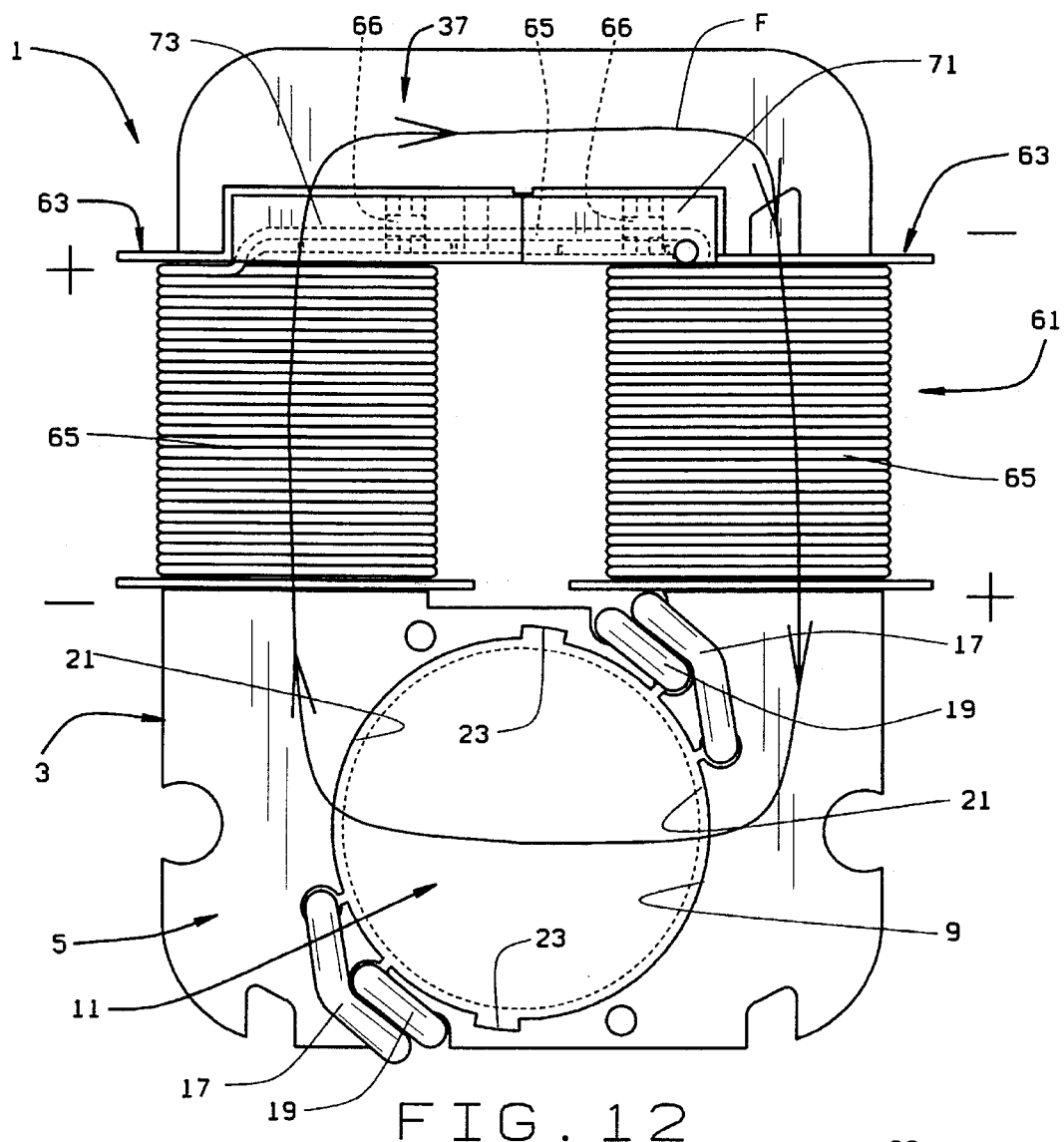
FIG. 12 is an enlarged side elevational view of the twin-bobbin C-frame motor shown in FIG. 1 with a modified form of insulating bobbin assembly illustrated in FIGS. 13–15 of the drawings.
Figure 13:
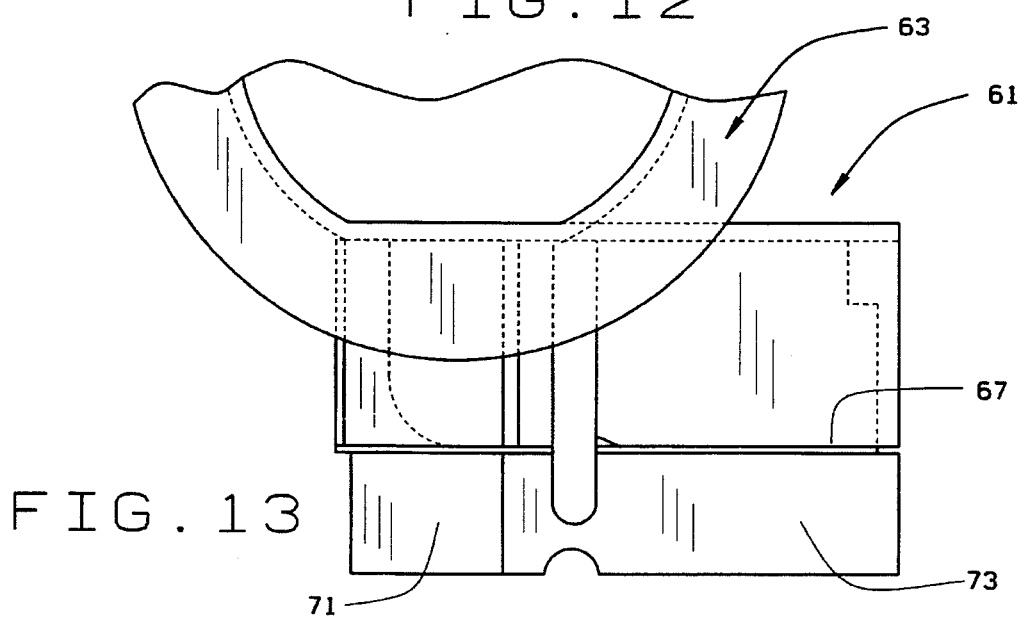
FIG. 13 is a fragmentary top plan view of the insulating bobbin assembly used in the FIG. 12 twin bobbin C-frame motor.

The aforementioned proximate location of the electrically conductive coils 35, 35 also provides a reduction in the magnetic inductor circuit flux path, thus providing a greater and/or more efficient flow of magnetic flux through the poles 21 and into the rotor 11. A reduction in the flux path may also result from the reduction in the width of the stacked side legs 7, 7, providing a reduction in the overall dimension of the motor and/or a reduction in the magnetic inductor circuit flux path and enabling a greater and/or more efficient flow of magnetic flux through the poles 21, 21 and into the rotor 11 of the motor 1. By comparing FIGS. 11–12 of the drawings, it will be seen that the upper intersecting openings 15, 15 are located in such a position as shown in FIG. 11 as to cause the pole shading elements 17, 19 as shown in FIG. 12 to be angled or curved toward the center between the stacked side legs 7, 7. As a result, the combined width of and/or the spacing between the stacked side legs 7, 7 and thus the overall dimension of the motor 1 can be reduced by removing material along the outer or marginal side edges of the stacked side legs 7, 7. This has the practical result of providing a more efficient flow of magnetic flux through the poles 21, 21 into the rotor 11.

Performance tests have established that motors so constructed have greater overall efficiency than conventional C-frame motors of the prior art. This was achieved in spite of the substantial reduction in the amount of material required for the electrically conductive coil 35 or as a result from the substantially circular outer cross sectional shape 27 of the stacked side legs 7, 7. This improvement in motor efficiency is also believed possible even where the outer cross sectional configuration of the stacked side legs 7, 7 has a typical four-sided (square or rectangular) configuration since the flux through the poles and rotor can be increased by the proximate location of the electrically conductive coils 35, 35 and/or the overall dimensional reduction of the motor, as described above.

A four-sided construction is illustrated in FIGS. 7–11 of the drawings where the C-frame two pole shaded pole type motor 51 is shown. The motor 51 is similar in all respects to the motor 1, with the exception of the following differences. First, each of the stacked side legs 7, 7 have a combined predetermined outer cross sectional configuration coil winding area that is of the typical four-sided (square or rectangular) shape. This enables an insulating bobbin 53 with wound electrically conductive coil or wire 55 having a corresponding shape to be mounted over the outer cross sectional configuration coil winding area 27 of each of the stacked side legs 7.

Even though there is a greater amount of electrically conductive wire used in forming the electrically conductive coil 55, as compared to the higher order greater than four side shape coil winding area 27 in the FIGS. 1–6 embodiment, it has nonetheless been found that the FIGS. 7–11 construction provides substantial cost reductions and in some cases, better operating efficiency over conventional C-frame motors. As explained above, this is believed to be due to shorter wire length, the greater surface winding area and the proximity of the electrically conductive coils 55 on each of stacked side legs 7, 7 relative to the rotor opening 9 and rotor 11 when mounted on the stacked side legs 7, 7. The magnetic inductor circuit flux path is reduced by the reduction in width of and/or the spacing between the spaced side legs due to the repositioning of at least part of the pole shading elements 17, 19 between the stacked side legs 7, 7, as explained above.

In either or both of the FIGS. 1–6 or 7–11 embodiments, a further modification of the motors 1 or 51 may be achieved through the use of the insulating bobbin assembly 61 illustrated in FIGS. 12–18 shown in conjunction with the motor 1 embodiment. The insulating bobbin assembly 61 includes a spaced pair of insulating bobbins 63, 63 that are adapted to be wound with an electrically conductive coil or wire 65 for mounting over the spaced stack legs 7, 7. In this particular embodiment; however, the spaced pair of insulating bobbins 63, 63 are integrally connected to one another across a living foldable hinge 67 as a one-piece injection molded product.

Figure 14:
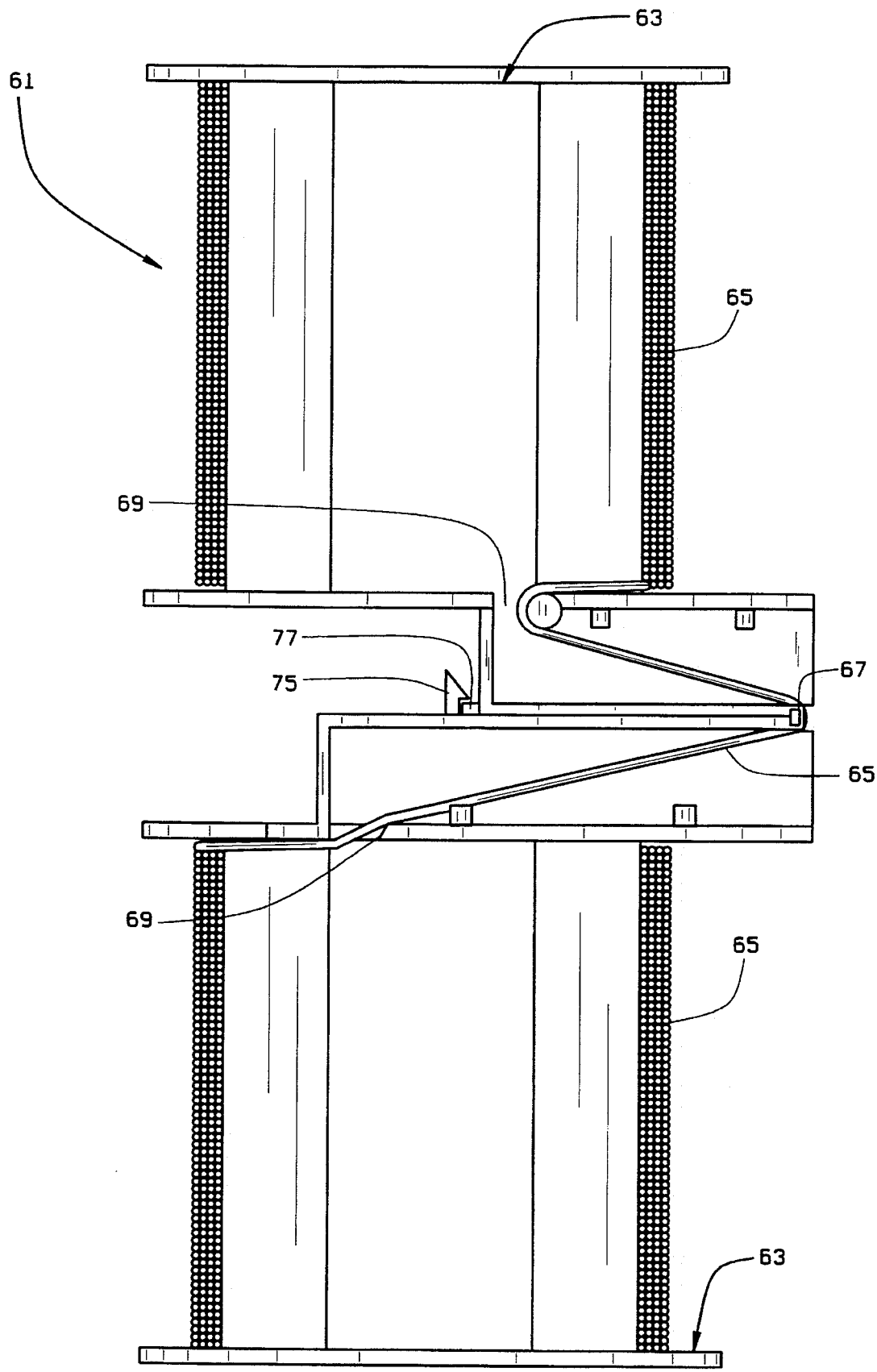
FIG. 14 is an enlarged side elevational view illustrating the manner in which the integral twin bobbin assembly is used in the winding of an electrically conductive wire about the spaced insulating bobbins to form separate electrically conductive coils from a single electrically conductive wire.

The spaced pair of insulating bobbins 63, 63 are positioned and maintained in longitudinally axially aligned relationship during the winding of an electrically conductive wire 65 about each bobbin 63, as illustrated in FIG. 14 of the drawings. For this purpose, each insulating bobbin 63 includes an end aperture 69 through which the electrically conductive wire 65 extends between the insulating bobbins. Thus is illustrated in FIG. 14 of the drawings where the single electrically conductive wire 65 is shown as being used for both of the spaced insulating bobbins 63, 63. As will be appreciated, this reduces the amount of terminal connections required, thus saving further material and manufacturing costs.

Figure 15:
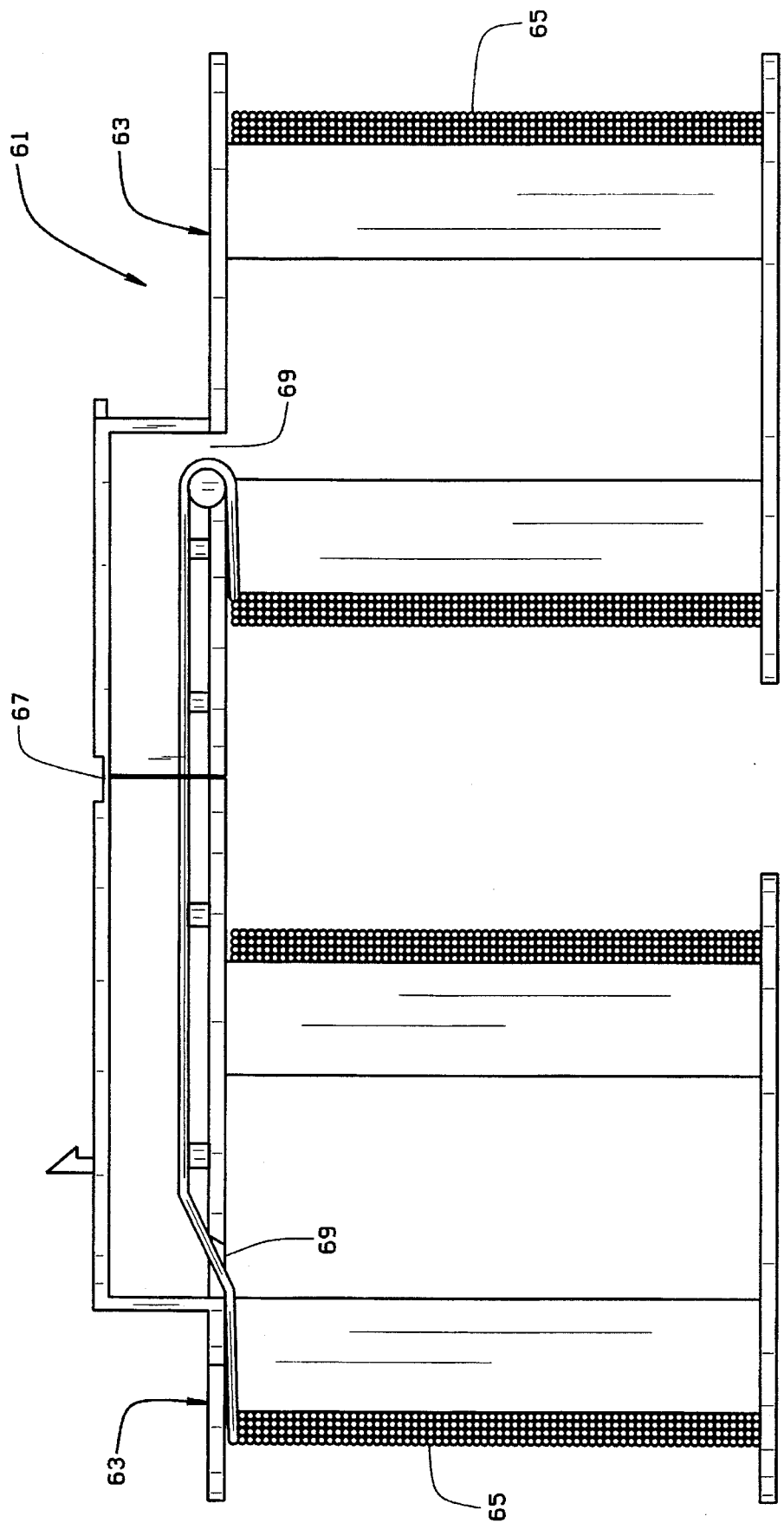
FIG. 15 is an enlarged side elevational view illustrating the manner in which the integral twin bobbin assembly is folded, after winding, for assembly relative to spaced legs of C-shaped laminations in the twin bobbin C-frame motor illustrated in FIG. 12.
Figure 16:
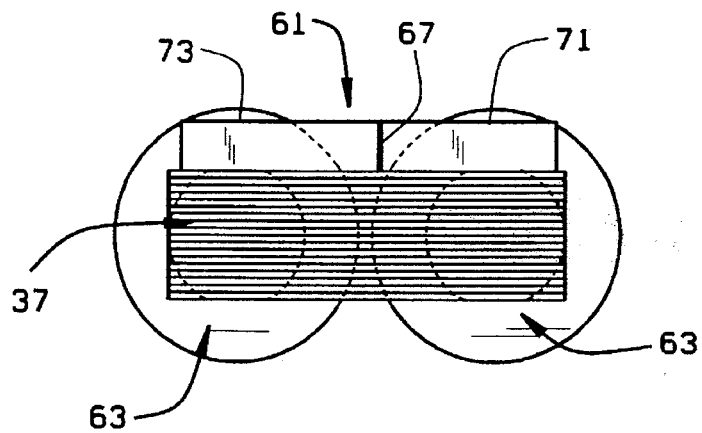
FIG. 16 is a top plan view of insulating bobbin assembly when mounted in the FIG. 12 C-frame motor.

Once the spaced insulating bobbins 63, 63 are wound with the desired amount of electrically conductive wire 65, the spaced pair of insulating bobbins 63, 63 are folded about the living foldable hinge 67 in order to position the longitudinal axes of the spaced bobbins 63, 63 in generally parallel relationship for mounting over the spaced side legs 7, 7 of the first stack of laminations 3. This relative position of the spaced insulating bobbins 63, 63 is best illustrated in FIGS. 15–16 of the drawings where the living foldable hinge 67 permits the integrally connected pair of bobbins 63, 63 to be moved to the illustrated position. Note in FIG. 16 the relative position of the bobbins 63, 63 and the living foldable hinge 67 relative to the second stack of laminations 37. This same position is illustrated in FIG. 12 of the drawings where the insulating bobbin assembly 61 is shown as being mounted over the spaced stacked legs 7, 7. When mounted in the motor 1 as illustrated in FIG. 12 of the drawings, the insulating bobbin assembly 61 is shown as further including juxtaposed releasable locking end flaps 71, 73 for covering the electrically conductive wire 65 between the insulating bobbins 63, 63. Releasable locking means 75, 77 are also utilized with the living foldable hinge 67 when the spaced pair of bobbins 63, 63 are mounted in longitudinally axially aligned relationship, as illustrated in FIG. 14, in order to maintain the spaced pair of bobbins 63, 63 in such relationship for handling purposes.

Figure 17:
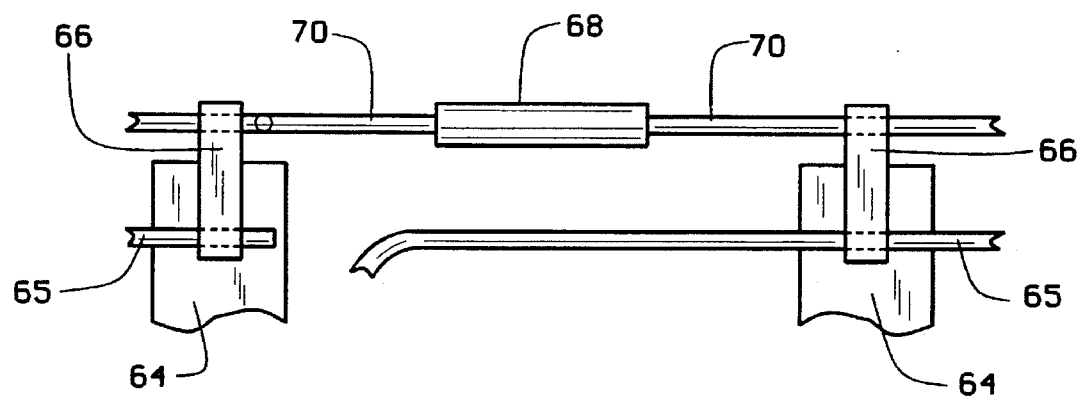
FIG. 17 is a fragmentary side elevational view showing the electrical connection between the spaced insulating bobbins in the FIG. 12 motor when a thermal protector is used.
Figure 18:
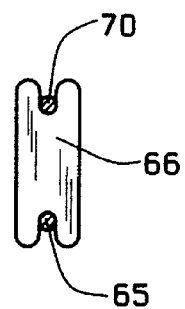
FIG. 18 is an end elevational view of a terminal used in the electrical connection between the spaced insulating bobbins shown in FIG. 17.

The electrical connection for the electrically conductive wire 65 between the insulating bobbins 63, 63 in the insulating bobbin assembly 61 is shown in FIGS. 17–18 of the drawings. It will be seen that terminal bases 64, 64 of the bobbin assembly 61 integrally mount and support spaced terminals 66, 66. After being wound on the insulating bobbins 63, 63, the electrically conductive wire 65 is cut between the spaced terminals 66, 66 and a protector 68 with extended wires 70, 70 is mounted to the terminals 66, 66 as shown in FIG. 18. The protector 68 is a temperature sensor that is pre-set to interrupt the electrical circuit at a predetermined temperature in the event excessive heat is caused by motor locking or other difficulties.

The insulating bobbin assembly 61 thus not only facilitates the winding of a single electrically conductive wire 65 on the spaced interconnected insulating bobbins 63, 63, but further facilitates the joint assembly and mounting of the spaced insulating bobbins 63, 63 relative to the spaced legs 7, 7 of the first stack of laminations 3, as will be appreciated.

Figure 19:
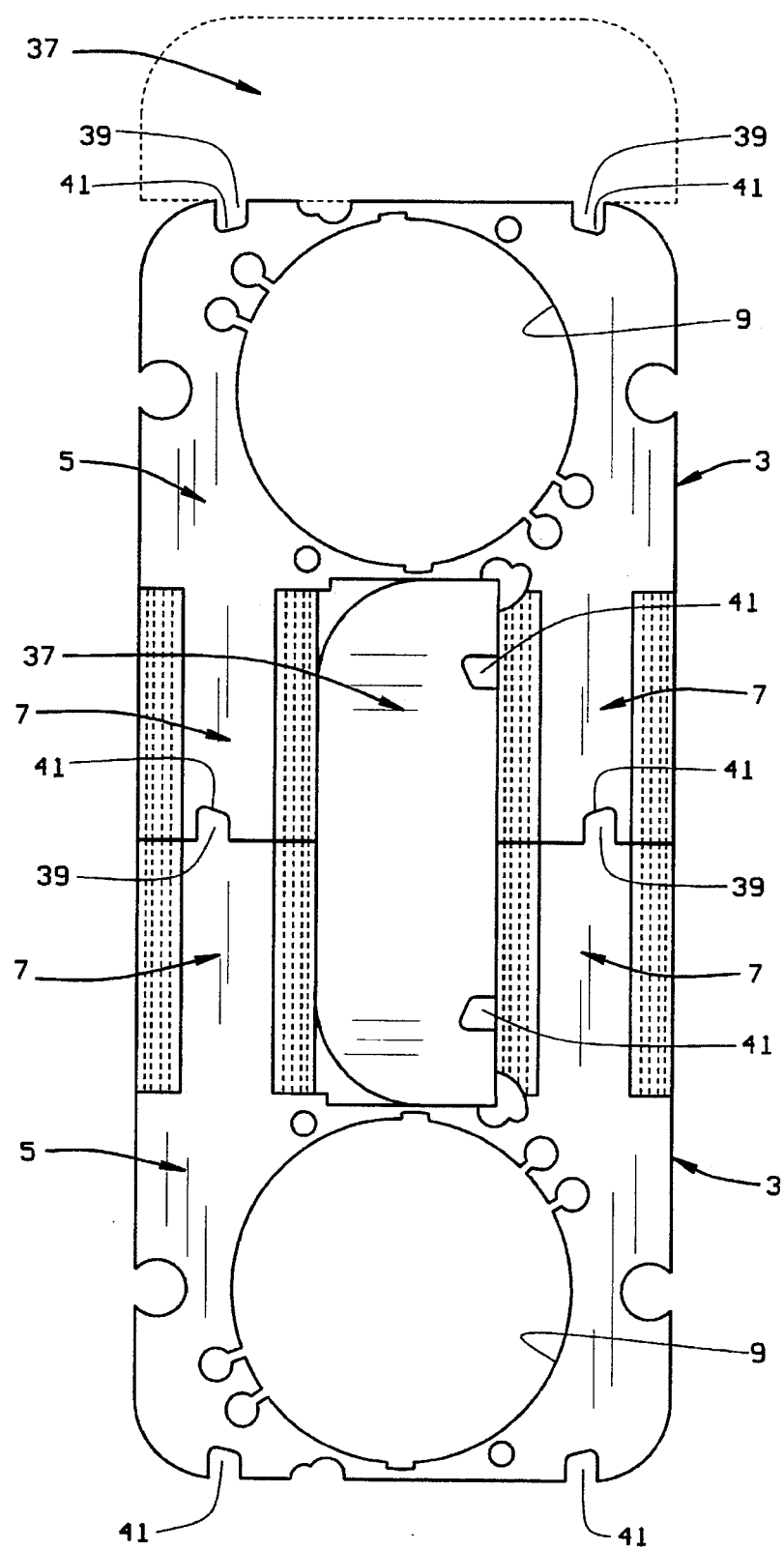
FIG. 19 is a top plan view illustrating the die layout used in the method of manufacturing C-frame laminations and end laminations in one method of the present invention.
Figure 20:
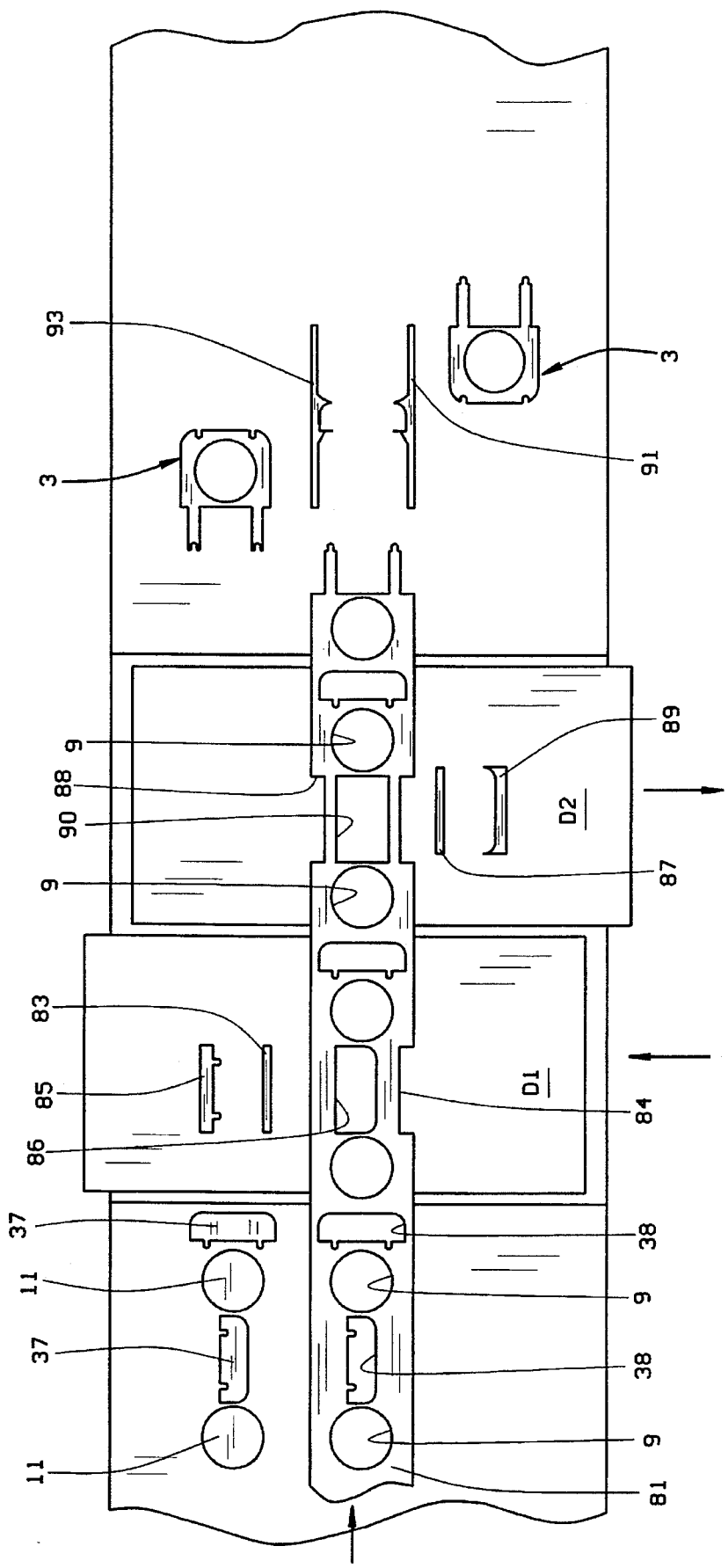
FIG. 20 is a top plan schematic view depicting the various steps in one manufacturing process or method of the present invention.

The method of forming C-frame laminations of the type illustrated in FIGS. 1–6 of the drawings can best be understood by reference to FIGS. 19–20 of the drawings. As shown in FIG. 19 of the drawings, one preferred method of forming each of the magnetically conductive stacked laminations 3 that form the first stack of laminations 3 includes the manufacture of adjacent C-frame laminations 3, 3 in generally opposed mirror image relationship to one another with the spaced side legs 7, 7 of each lamination 3 extending longitudinally in the FIG. 16 illustration and with the separate end leg lamination 37 illustrated as being formed between the spaced legs 7, 7 of opposed mirror image laminations 3, 3. A second end leg lamination 37 is also illustrated in phantom lines as being formed at one end of the upper lamination 3, if desired, although it will be appreciated that some or all end leg laminations 37 may be formed from a separate strip of magnetically conductive material, if desired.

In the FIG. 19 die layout, it will be seen that the opposed mirror image laminations 3, 3 are formed with interfitting male and female fastening elements 39, 41 in aligned spaced legs 7, 7 of opposing mirror image laminations 3, 3. On the other hand, the separate end leg lamination 37 formed within the confines of the spaced legs 7, 7 of the opposed mirror image laminations 3, 3 have complementary shaped female recesses 41, 41 while the other end leg lamination 37 has male fastening elements 39, 39. Thus, the lower lamination 3 with the extending male fastening tabs 39, 39 is adapted to be used in conjunction with the separate end leg lamination 37 within the confines of the spaced legs 7, 7 of the opposed mirror image laminations 3, 3 since it has spaced female recesses 41, 41 for complementary association therewith. The upper lamination 3 has female fastening recesses 41, 41 at the outer extremities of the spaced legs 7, 7 for complementary association with the male fastening tabs 39, 39 that extend from the other separate end leg lamination 37.

Reference is now made to FIG. 20 of the drawings for an illustration of the manner in which the laminations shown in FIG. 19 are formed. An elongated strip of magnetically conductive coil stock 81 is fed from left to right as illustrated by the arrow at the left hand side of FIG. 20. The coil stock 81 is progressively fed, by well-known stock feeding mechanisms (not shown) through various stages or stations foraging a progressive punching or stamping system. The stages or stations in the manufacturing method are represented by the die layout stages or stations illustrated in FIG. 20 of the drawings to illustrate how the various punching or stamping stages or stations operate on the coil stock 81.

As viewed from left to right in FIG. 20 of the drawings, the successive series of die cutting or stamping steps first includes the forming of spaced rotor openings 9, 9 which also produce the rotor laminations 11, 11 shown to the left side of the coil stock 81. At the same time, the separate end laminations 37, one longitudinally aligned with the coil stock 81 and the other transversely extending relative to the coil stock 81, may also be formed in the elongated strip or coil stock 81 resulting in the production of the two end leg laminations 37, 37, also shown to the left hand side of the strip. It will be understood that the formation of the rotor openings 9, 9 and the openings 38, 38 left by the separate longitudinally and transversely extending end leg laminations 37, 37 does not otherwise interfere with the subsequent forming of the laminations 3, in the successive series of steps now to be described.

At the next die station or stage, a movable die set D1 moves to the left relative to the coil stock 81, following indexing of the coil stock 81. The movable die set D1 is moved by a controller (not shown) which moves the die set D1 a predetermined amount, following which punching takes place to remove an elongated scrap piece 83 from the right hand side of the elongated strip 81 leaving the U-shaped opening 84 while, at the same time, removing the scrap piece 85 adjacent to the longitudinally extending end leg opening 38, in order to form the enlarged opening 86 in the elongated strip.

At the next station, the movable die section D2 is moved by a controller (not shown) to the right, following which punching takes place to remove the scrap piece 87 from the left hand side of the strip 81 to form the left U-shaped opening 88 and the additional scrap piece 89 is removed from the elongated strip 81 adjacent to the longitudinally extending end leg opening 38 on an opposite side from the scrap piece 85 previously formed, in order to produce the enlarged opening 90.

It will be understood that the movable die sections D1 and D2 are designed to move predetermined amounts depending upon the desired width of the spaced legs 7, 7 in forming the incremental stair-shaped generally circular outer cross sectional configuration 27, as illustrated in FIGS. 1–6. While the method and apparatus for accomplishing this forms no part by itself of the present invention, reference is made to copending patent application U.S. Ser. No. 08/381,188 filed Jan. 31, 1995 entitled CONTROLLED ADJUSTABLE MANUFACTURING METHOD AND APPARATUS FOR VARIABLE LAMINATIONS USED IN ELECTROMAGNETIC INDUCTION DEVICES for a specific description of the manner in which various adjustable widths can be formed in adjacent laminations to produce the incremental stair-stepped generally circular outer cross sectional shape for the spaced stacked legs 7, 7 of the laminations.3.

The final stage in the method illustrated in FIG. 20 of the drawings shows the opposed mirror image laminations 3, 3 being stamped from the elongated strip 81, while scrap edge pieces 91, 93 are being removed. Each of the laminations 3, 3 will then be fed to separate stacks where the laminations are accumulated and stacked to produce the desired motor construction. As a result of the method illustrated in FIG. 20 of the drawings, the pair of laminations 3, 3 formed at the final stage of the manufacturing procedure will be fed to different stacks since the outer free extremities of the spaced side legs have different male/female fastening tabs/recesses 39, 41. It will be apparent that the separate end leg laminations 37, 37 with corresponding complementary male or female fastening elements will be appropriately used with the correct lamination 3, 3 for interfitting fastening assembly.

While the method of FIG. 20 illustrates a pair of separate end leg laminations 37, 37 being formed from the elongated strip 81, it will be understood that some of the separate end leg laminations 37, 37 may be formed from a separate elongated strip of magnetically conductive material, if desired.

In some instances, it may be desirable to form both of the separate end leg laminations 37, 37 from the elongated strip between the opposed and spaced side legs of adjacent C-frame laminations which are in opposed mirror image relationship to one another. A suitable die layout for this purpose is illustrated in FIG. 23 of the drawings. In order to accomplish this, the spaced side legs 7, 7 of each respective lamination must be spaced apart a further distance from one another, as illustrated in FIG. 23 of the drawings. This produces a motor 101 of the type shown in FIGS. 21–22 of the drawings which is similar in all respects to the motor illustrated in FIGS. 1–6 of the drawings with the exception that the spaced and stacked side legs 7, 7 are spaced apart a distance greater than the FIGS. 1–6 embodiment in order to produce the pair of separate end leg laminations 37, 37 between the opposed mirror image adjacent laminations 3, 3 shown in FIG. 23. It will be apparent that while this will provide savings in the manufacturing method, it may not result in the desirable horsepower output for the motor since the magnetic inductor circuit is enlarged, as will be apparent.

Figure 24:
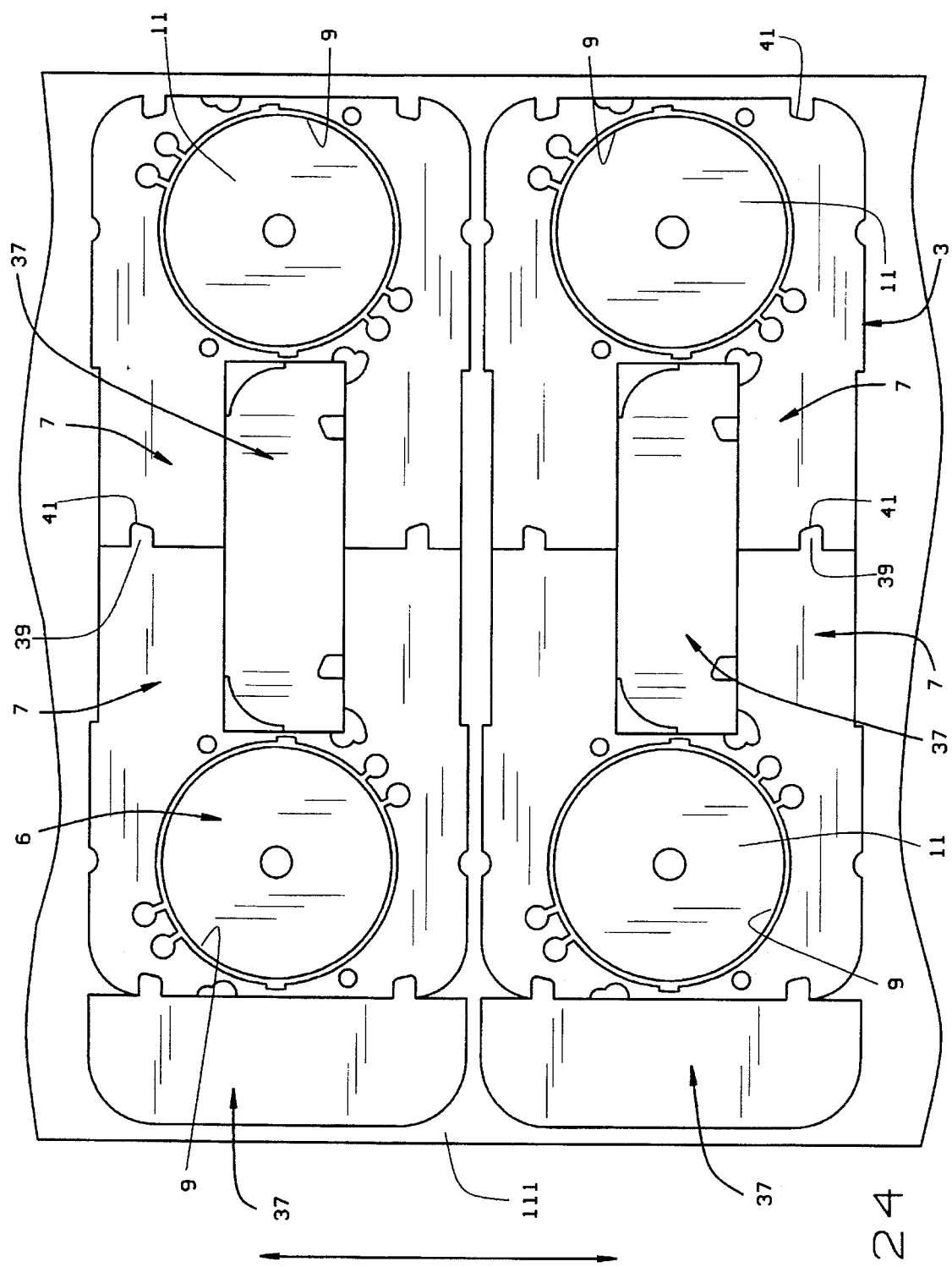
FIG. 24 is a die layout view illustrating one method for forming the FIGS. 7–11 embodiment.

In the method for manufacturing C-frame laminations illustrated in FIGS. 7–11 of the drawings, it will be apparent that the movable die sets D1 and D2 used in manufacturing the FIGS. 1–6 embodiment will not be required. Thus, the simplified process shown in FIG. 24 can be used. In this instance, the die layout of FIG. 24 shows the FIGS. 7–11 laminations as being formed transverse to the feed of the strip 111 as compared to the method shown in FIGS. 19–20. It will be understood that the FIGS. 7–11 laminations could also be formed longitudinally of the strip, if desired. Similarly, FIG. 1–6 laminations could be formed transversely of the elongated strip, although the movable die sets required for the FIGS. 1–6 embodiment would be more complex because of their longitudinal movement.

In the FIG. 24 die layout, the simplified process for forming the FIG. 7–11 laminations includes a first stage or station for stamping the rotor laminations 11, 11 out of the mirror image laminations 33 to be formed. A second stage includes the stamping of the end lamination 37 which extends between the legs 7, 7 of each lamination 3 to be formed as well as the end lamination 37 at one outer edge of the laminations 3 to be formed. Finally, the left or right lamination 3 is stamped followed by the stamping of the other right or left lamination 3. Without the movable die sets required for the FIGS. 1–6 embodiment, the manufacturing process is thus much more simplified.

With the FIGS. 1–6 embodiment, more steel will be required than the FIGS. 7–11 embodiment since the combined width of the legs 7, 7 of each lamination 3 in the FIGS. 7–11 embodiment can be reduced due to the re-positionment of the openings 15, 15 at the upper end of the aligned rotor opening 9, enabling material savings along the outer or marginal side edges of the legs 7, 7. On the other hand, the FIGS. 1–6 embodiment will have increased copper savings over the FIGS. 7–11 embodiment due to the higher order than four side outer cross sectional shape of the legs 7, 7, as explained above. However, all of the embodiments provide copper savings due to spaced stacked leg construction with wound electrically conductive coils, as explained above.

While the preferred construction includes electrically conductive coils each having less than one-half of the electrically conductive wire of a single electrically conductive coil in an equivalent magnetic inductor circuit, it is possible to use only one such electrically conductive coil on a single stacked side leg or an electrically conductive coil on each stacked side leg where one of the electrically conductive coils has more turns of electrically conductive wire than the other, i.e., one electrically conductive coil has less than one-half of the electrically conductive wire and the other has more than one-half of the electrically conductive wire. Further, while the preferred method includes the use of spaced bobbins mounted over spaced stacked legs of a first stack of laminations with the subsequent attachment of end leg laminations to the spaced stacked lamination legs, it is also possible to manufacture one-piece laminations with spaced stacked legs and then use split bobbins that are gear wound with electrically conductive wire, as described in some of my aforementioned patent applications. Where twin bobbins are used on each of the side legs of the stacked laminations, the amount of copper or alumina required for the coils can be reduced, as well as a reduction in the amount of steel due to the lamination construction of the present invention, as explained above. In the case of a single coil positioned on one of the side legs of the stacked laminations, no significant reduction in the copper of aluminum wire may result. However, the proximate location of the single coil relative to the poles and rotor of the motor, as well as the apparent increase in exposed steel lamination surface area in such a motor construction, enables such a motor to run substantially cooler than equivalent conventional C-frame motors. Thus, it is possible to save steel by reducing the number of laminations in the stack to provide an equivalent output performance for a single coil motor constructed in accordance with the present invention as compared to a thicker stack conventional C-frame motor. Additional steel savings in such single coil motors would also result from the lamination construction of the present invention. The electrical operation of the various motor embodiments can best be understood by reference to FIG. 12 of the drawings which shows the motor polarity and flux path. The polarity at a first end of each of the legs 7, 7, where the legs 7, 7 are attached at circumferentially spaced areas to the end leg 5 that contains the rotor opening 9, are of opposite polarity on opposite sides of the reluctance gaps 23, 23 segregating the two poles 21, 21. As a result, the free extremities of the legs 7, 7 at a second end are of opposite polarity to the first end of the legs 7, 7. The coils 35, 35 are connected in series as shown and as previously described, and therefore aid in the flux generation in the flux pattern that is shown by the flux path F. The first end of the legs 7, 7, at their attachment to the end leg 5 work in series to push and pull the flux through the end leg 5 and rotor 11, while the second end of the legs 7, 7 each serves as a flux conduit connecting the opposite polarity poles at the first end of the legs 7, 7. In this way, the flux path F operates in a continuously encircling perimeter path in the various motor embodiments of the present invention. Additionally, the operating efficiency of the motor of the present invention, including the efficient flow of flux in the flux path F, will be enhanced for all of the reasons discussed above.

From the foregoing, it will now be appreciated that the novel and unique C-frame motor construction, illustrated as a twin bobbin C-frame motor, provides substantial material savings in the amount of material required, as compared with prior an designs. At the same time, the substantial reduction in motor material cost does not impair the operating performance or efficiency since the C-frame motors of the present invention have been designed with both end results in mind. The insulating bobbin assembly is also usefully employed in enhancing production and maximizing cost savings. The same is true of the method of the present invention which provides cost saving advantages over other prior an methods.

In view of the above, it will be seen that the several objects and advantages of the present invention have been achieved and other advantageous results have been obtained.

As various changes could be made in the above constructions or methods without departing from the scope of the invention, it is intended that all matter contained in the above description or shown in the accompanying drawings shall be interpreted as illustrative and not in a limiting sense.

I claim:

1. A shaded pole motor comprising:

magnetically conductive stacked laminations each having a spaced pair of end legs extending generally transversely to a spaced pair of generally parallel side legs with an outer side margin of each spaced side leg being generally aligned with an outer end margin of each end leg, the combined stacked configuration of said laminations providing spaced and stacked end legs and spaced and stacked side legs;

one of said spaced and stacked end legs having aligned circumferentially continuous rotor openings for receiving a rotor;

each spaced and stacked side leg at a first end extending generally transversely from one circumferentially spaced area adjacent to and surrounding the rotor openings of said one spaced and stacked end leg while being connected at a second end to the other of said spaced and stacked end legs, the first end of each of said spaced and stacked side legs at its circumferentially spaced area having a different polarity from the other spaced and stacked side leg to provide an alternating polarity of two poles around the rotor openings, the second end of each spaced and stacked leg having a different polarity than its first end;

pole shading elements for each of the two poles;

a coil winding area for each spaced and stacked side leg having a combined predetermined length and outer cross sectional configuration, the distance between the spaced and stacked side legs providing a joint winding window to accommodate electrically conductive coils on each coil winding area of predetermined length and winding diameter; and an electrically conductive coil positioned about the coil winding area of at least one of said spaced and stacked side legs, each such electrically conductive coil having one coil end positioned in immediate proximity to the circumferentially spaced area associated with one of said spaced and stacked side legs as well as being adjacent said aligned rotor openings and rotor, and each such electrically conductive coil generating flux in one continuous path through the spaced and stacked side legs and spaced and stacked end legs including the rotor.

2. The motor as defined in claim 1 wherein each lamination has at least one end leg which is integral with at least part of said spaced pair of side legs.

3. The motor as defined in claim 2 wherein the aligned rotor openings are formed in the end legs of said laminations which are integral with at least part of said side legs.

4. The motor as defined in claim 1 wherein one end leg in each lamination is separate from the spaced side legs with integral end leg, each separate end leg being attached to the spaced side legs at an outer free extremity thereof.

5. The motor as defined in claim 4 wherein complementary fastening elements are formed at the outer free extremity of said spaced side legs for attachment to complementary fastening elements that are formed on said separate end legs.

6. The motor as defined in claim 1 wherein an insulating bobbin with wound electrically conductive coil wound in closed packed relationship in a plurality of juxtaposed rows is positioned on each said coil winding area.

7. The motor as defined in claim 1 including an electrically conductive coil positioned about each coil winding area of said spaced and stacked side legs, each electrically conductive coil including an electrically conductive wire having a predetermined winding length, predetermined mean winding diameter, and predetermined wire diameter to achieve desired operating efficiency and cost.

8. The motor as defined in claim 7 wherein the pole shading elements are positioned in openings surrounding said aligned rotor opening in proximity to the poles of said motor, at least part of said pole shading elements on one side of said aligned rotor openings being angled to extend generally between the stacked side legs.

9. The motor as defined in claim 7 wherein an electrically conductive wire forming each electrically conductive wire has approximately one-half the predetermined winding length and predetermined mean winding diameter of the two electrically conductive coils.

10. The motor as defined in claim 9 including an electrically conductive coil positioned about each coil winding area of the spaced and stacked side legs to provide a plurality of electrically conductive coils, the plurality of electrically conductive coils having a greater winding length and smaller mean winding diameter than a single electrically conductive coil positioned about an end leg in an equivalent conventional C-frame motor construction.

11. The motor as defined in claim 1 wherein the combined predetermined outer cross sectional coil winding area of each of said stacked side legs has a generally four-sided outer cross sectional shape and each electrically conductive coil positioned about each of the stacked side legs has a corresponding shape.

12. The motor as defined in claim 1 wherein the combined predetermined outer cross sectional coil winding area of each of said stacked side legs has a generally higher order greater than four sides outer cross sectional shape and each said electrically conductive coil positioned about each of said stacked side legs has a corresponding shape.

13. A shaded pole motor comprising:

magnetically conductive stacked laminations each having an end leg and a generally transversely extending spaced pair of side legs, the spaced pair of side legs each being attached at a first end of said side legs to a marginal end area of said end leg and terminating in an outer free extremity at a second end of said side legs, the combined stacked end legs and spaced pair of stacked side legs providing a first stack of laminations;

a rotor opening provided in the end leg of each lamination that is aligned with the rotor openings of adjacent stacked end legs to provide an aligned rotor opening in the stacked end legs for receiving a rotor;

two opposite poles around the aligned rotor opening each having an associated pole shading element;

each of the spaced pair of stacked side legs at its first end extending from one aligned circumferentially spaced area adjacent to and surrounding the aligned rotor openings, the first end of one of said pair of stacked side legs having a different polarity than the first end of said other stacked side leg, the second end of each stacked side leg having different polarity than at its first end;

each of the stacked side legs having a combined predetermined length and outer cross sectional configuration coil winding area;

an electrically conductive coil positioned about the coil winding area of each of the stacked side legs, said electrically conductive coils being connected in series with one another;

each electrically conductive coil having one coil end positioned in proximity to the aligned circumferentially spaced areas associated with said stacked side legs as well as being adjacent said aligned rotor opening and rotor;

a corresponding number of separate magnetically conductive stacked laminations providing a second stack of laminations for attachment to the outer free extremity of said spaced pair of stacked side legs in said first stack of laminations in order to provide a combined magnetic inductor circuit therethrough: and each electrically conductive coil being formed by an electrically conductive wire having a predetermined winding length, predetermined mean winding diameter, and predetermined wire diameter to achieve desired operating efficiency and cost.

14. The motor as defined in claim 13 wherein the second stack of laminations and outer free extremity at the second end of each spaced pair of stacked legs of said first stack of laminations are attached through complementary shaped male and female fastening elements for interfitting engagement with one another.

15. The motor as defined in claim 13 wherein pole shading elements are positioned in openings surrounding said aligned rotor opening in proximity to the poles of said motor, at least part of said pole shading elements on one side of said aligned rotor opening between said stacked side legs being angled to extend generally between said stacked side legs in order to reduce the overall dimension of the motor.

16. The motor as defined in claim 15 wherein an electrically conductive wire forming each said electrically conductive coil has approximately one-half the predetermined winding length and predetermined mean winding diameter of the two electrically conduit coils.

17. The motor as defined in claim 13 including an electrically conductive coil positioned about each coil winding area of the spaced and stacked side legs to provide a plurality of electrically conductive coils, the plurality of electrically conductive coils having a greater winding length and smaller mean winding diameter the a single electrically conductive coil positioned about an end leg in a conventional C-frame motor construction.

18. A C-frame motor comprising:

C-frame shaped magnetic inductor circuit means having a pair of spaced side legs extending generally transversely to and being interconnected to outer marginal areas of an end leg at a first end and terminating in a second free end:

a rotor opening provided in the end leg for receiving a rotor:

opposite poles around the rotor opening each having an associated pole shading element;

the pair of spaced side legs at a first end extending from circumferentially spaced areas to the end leg surrounding the rotor opening, the first end of each spaced side leg at said circumferentially spaced areas having an opposite polarity from each other, the polarity at the second free end of the spaced side legs being opposite from the first end;

each of said spaced side legs having a coil winding area with a combined predetermined length and outer cross sectional configuration, the distance between the spaced side legs providing a joint winding window to accommodate electrically conductive coils on each coil winding area of predetermined length and width:

an electrically conductive coil positioned about the coil winding area of each of said spaced side legs with one coil end positioned in immediate proximity to one of the circumferentially spaced areas while being adjacent the rotor opening and rotor, said electrically conductive coils being connected in series with one another: and said magnetic inductor circuit means having a separate end leg for attachment to the free second end of each spaced side leg to complete the magnetic inductor circuit means for the C-frame motor.

19. A C-frame motor comprising:

magnetically conductive stacked laminations each having three separate legs including an end leg and two spaced side legs, each of the two spaced side legs extending generally transversely to as well as being connected to outer marginal areas of the end leg while terminating in a free extremity at a second end, the combined stacked configuration of the two side legs and end leg of the stacked laminations providing a series of C-frame shaped stacked laminations;

a rotor opening provided in each lamination end leg that is aligned with the rotor openings of adjacent C-frame stacked laminations to provide an aligned rotor opening in the end legs of the stacked laminations for receiving a rotor;

opposite poles around the aligned rotor opening each associated with a pole shading element;

the spaced two side legs extending from circumferentially spaced areas surrounding the rotor opening in the end leg each having a different polarity at their respective first ends, the second end of each side leg having a different polarity than at its first end;

each of the side legs having a coil winding area of combined predetermined outer cross sectional configuration;

an insulating bobbin with wound electrically conductive coil positioned about the coil winding area of the side legs;

a spaced pair of insulating bobbins positioned about said side legs and being integrally connected to one another while the associated wound electrically conductive coils of said insulating bobbins comprising an electrically conductive wire that is integrally and electrically connected in series and wound about both of said insulating bobbins;

each electrically conductive coil having one coil end positioned in immediate proximity to one of the circumferentially spaced areas surrounding the rotor opening while also being adjacent the rotor opening and rotor; and separate magnetically conductive stacked laminations corresponding in number to the C-frame stacked laminations and configured to extend across the side legs for attachment to the second end of the side legs in order to complete a magnetic inductor circuit for the C-frame motor.

20. The C-frame motor as defined in claim 19 wherein the spaced pair of insulating bobbins have aligned longitudinal axes when wound with the electrically conductive wire and generally parallel longitudinal axes when mounted on the coil winding areas of said spaced and stacked side legs.

21. An insulating bobbin assembly comprising:

a spaced pair of insulating bobbins having aligned longitudinal axes which are integrally connected to one another across a living foldable hinge;

said spaced pair of insulating bobbins being maintained in longitudinal axially aligned relationship during the winding of an electrically conductive wire forming an electrically conductive coil about each bobbin: and said spaced pair of insulating bobbins being folded about the foldable hinge to position said longitudinal axes of said bobbins in generally parallel relationship for mounting over spaced legs in a magnetic inductor circuit.

22. The insulating bobbin assembly as defined in claim 21 wherein the foldable hinge includes releasable locking means to maintain said spaced pair of bobbins in longitudinal axially aligned relationship.

23. The insulating bobbin assembly as defined in claim 21 wherein each insulating bobbin includes end apertures through which the electrically conductive wire extends between said insulating bobbins.

24. The insulating bobbin assembly as defined in claim 23 wherein the foldable hinge is juxtaposed releasable locking end flaps for covering the electrically conductive wire between said insulating bobbins.

25. A motor comprising: magnetically conductive stacked laminations each having a multi-pole portion with a rotor opening and spaced and adjacent side legs extending generally transversely from circumferentially spaced areas of and within the confines of said multi-pole portion, each spaced side leg at its circumferentially spaced area of said multi-pole portion having a different polarity than an adjacent side leg at its circumferentially spaced area of said multi-pole portion, each spaced side leg terminating in an outer free extremity that has a different polarity than at its circumferentially spaced area of said multi-pole portion, the combined stacked laminations providing stacked and spaced side legs in circumferentially spaced areas of stacked multi-pole portions with aligned rotor openings for receiving a rotor; each of the stacked and spaced side legs having a combined predetermined length and outer cross sectional coil winding area, the distance between the stacked and spaced side legs providing a joint winding window to accommodate electrically conductive coils on each winding area of predetermined length and width; an electrically conductive coil positioned about the coil winding area of each of the stacked and spaced side legs and being connected in series with each other, each electrically conductive coil having one coil end in immediate proximity to its associated circumferentially spaced area of said multi-pole portion while being adjacent the aligned rotor openings and rotor, separate magnetically conductive stacked laminations forming an end leg for attachment to the outer free extremities of spaced and adjacent stacked side legs, and the series connected electrically conductive coils generating flux in one continuous path through the end leg, each side leg, multi-pole portion and rotor of the motor.

26. The motor as defined in claim 25 wherein each electrically conductive coil is an electrically conductive wire wound about the coil winding area of each of the stacked and spaced side legs, each electrically conductive wire having a predetermined winding length, predetermined mean winding diameter and predetermined wire diameter to achieve desired operating efficiency and cost.

27. The motor as defined in claim 25 in which the plurality of electrically conductive coils is two and have a greater winding length and smaller mean diameter than a single electrically conductive coil positioned about an end leg in an equivalent conventional C-frame motor construction.

28. A method of forming C-frame laminations each having an end leg integral with spaced side legs from an elongated strip of magnetically conductive material, comprising:

stamping from said elongated strip adjacent C-frame laminations with the integral end leg and spaced side legs of each lamination in generally opposed mirror image relationship to one another;

forming a combined predetermined outer cross sectional configuration coil winding area in the spaced side legs of each C-frame laminations: and forming two separate end legs for attachment to outer free extremities of each pair of spaced side legs, at least one of said separate end legs being formed from said elongated strip.

29. The method as defined in claim 28 wherein at least some of the separate end leg laminations are formed from the elongated strip between the spaced legs of said C-frame laminations.

30. The method as defined in claim 28 wherein at least some of the separate end leg laminations are formed from a separate elongated strip of magnetically conductive material.

31. The method as defined in claim 28 wherein at least two separate end leg laminations are formed from the elongated strip between the opposed and spaced side legs of adjacent C-frame laminations.

32. The method as defined in claim 28 including forming complementary fastening elements between the opposed and spaced side legs of adjacent C-frame laminations for attachment to complementary fastening elements formed in said separate end leg laminations.

33. The method as defined in claim 32 including alternately forming male and female fastening elements in different relative positions in adjacent pairs of generally opposed mirror image C-frame laminations.

34. A method of forming and stacking laminations for C-frame motors, comprising:

forming a series of magnetically conductive C-shaped laminations each having an end leg with a rotor opening and a spaced pair of side legs integral with and extending from the end leg and terminating in an outer free extremity;

forming a predetermined outer cross sectional configuration coil winding segment in each of the side legs of said C-frame laminations:

stacking the C-shaped laminations with the stacked coil winding segments in each of said stacked side legs forming a coil winding area of combined predetermined outer cross sectional configuration;

forming a series of separate magnetically conductive end leg laminations; and stacking a series of end leg laminations corresponding in number to said C-shaped laminations for subsequent attachment to the outer free end of said side legs of said C-shaped laminations.

35. The method as defined in claim 34 wherein said C-shaped laminations and said separate end leg laminations are formed from an elongated strip of magnetically conductive material, at least some of said separate end leg laminations being formed from strip material between the spaced legs of said C-frame laminations.

36. The method as defined in claim 34 wherein at least some of said separate end leg laminations are also formed from said strip material outside of the confines of said C-frame laminations.

37. The method as defined in claim 34 wherein adjacent C-frame laminations are formed in generally opposed mirror image relationship to one another in an elongated strip of magnetically conductive material, at least one end leg lamination being formed from strip material between the spaced legs of said mirror image C-frame laminations.

38. The method as defined in claim 34 wherein two separate end leg laminations are formed from strip material between the spaced legs of said mirror image C-frame laminations.

39. The method as defined in claim 34 wherein at least some of said separate end leg laminations are also formed from said strip material outside of the confines of said C-frame laminations.

40. A method of forming a C-frame motor, comprising:

forming a series of magnetically conductive C-shaped laminations each having an end leg with a rotor opening and a spaced pair of side legs integral with and extending from the end leg with predetermined incrementally varying widths in each of said side legs, each of said side legs terminating an outer free extremity;

stacking the C-frame laminations in generally vertically aligned relationship in a predetermined sequence with the predetermined incrementally varying widths in each of said side legs forming a coil winding area of generally circular outer cross sectional shape at last along opposed spaced sections;

forming a series of separate magnetically conductive end leg laminations corresponding in number to said C-shaped laminations for attachment to the outer free extremities of the side legs of said C-shaped laminations;

stacking said separate magnetically conductive end leg laminations in generally vertically aligned relationship;

positioning an electrically conductive coil about the coil winding areas of each of said side legs; and attaching said separate magnetically conductive end leg laminations to the outer free extremities of the side legs of said C-shaped laminations.

41. The method as defined in claim 40 including the step of winding an electrically conductive wire about an insulating bobbin to form each electrically conductive coil for each spaced side leg, each said insulating bobbin being connected to one another to facilitate winding of said electrically conductive wire about said insulating bobbins and the subsequent mounting of said insulating bobbins over said spaced stacked legs.

42. The method of forming a motor comprising:

forming a series of magnetically conductive U-shaped laminations each having an end leg and spaced side legs which terminate in outer free extremities:

stacking said U-shaped laminations to provide stacked end legs and stacked spaced side legs;

forming a separate series of magnetically conductive end leg laminations:

stacking said separate series of magnetically conductive end leg laminations:

forming aligned rotor openings in one of said end leg laminations for receiving a rotor;

positioning at least one electrically conductive coil about at least one of the stacked side legs of said stacked U-shaped laminations:

attaching the separate end leg laminations to corresponding outer free extremities of said spaced side legs of said U-shaped laminations.

43. The method as defined in claim 42 including the step of positioning an electrically conductive coil over each of the spaced stacked side legs of said U-shaped laminations.

* * * * *

UNITED STATES PATENT AND TRADEMARK OFFICE
CERTIFICATE OF CORRECTION

PATENT NO. : 5,619,086
DATED : April 8, 1997
INVENTOR(S) : Robert E. Steiner

It is certified that error appears in the above-indentified patent and that said Letters Patent is hereby corrected as shown below:

Claims 28-43, should be deleted

Column 20, Line 6
delete --the--
add --than--

Column 20, Line 20
delete --to--
add -- of before the--

Signed and Sealed this

Fourth Day of November, 1997

BRUCE LEHMAN

Attest:

Attesting Officer

Commissioner of Patents and Trademarks